(12) United States Patent
Kumazaki

(10) Patent No.: US 12,459,542 B2
(45) Date of Patent: Nov. 4, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventor: Kenta Kumazaki, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 18/501,095

(22) Filed: Nov. 3, 2023

(65) Prior Publication Data

US 2024/0217561 A1 Jul. 4, 2024

(30) Foreign Application Priority Data

Jan. 4, 2023 (JP) ................................. 2023-000216

(51) Int. Cl.
*B60W 60/00* (2020.01)

(52) U.S. Cl.
CPC ..... *B60W 60/0053* (2020.02); *B60W 2552/53* (2020.02); *B60W 2554/4041* (2020.02); *B60W 2554/4045* (2020.02)

(58) Field of Classification Search
CPC ......... B60W 60/0053; B60W 2552/53; B60W 2554/4041; B60W 2554/4045; B60W 30/18163
See application file for complete search history.

(56) References Cited

U.S. PATENT DOCUMENTS

| | | | |
|---|---|---|---|
| 11,396,296 B2 * | 7/2022 | Tsuji | |
| 2018/0231977 A1 * | 8/2018 | Uno | |
| 2019/0295417 A1 | 9/2019 | Hiramatsu et al. | |
| 2019/0315362 A1 * | 10/2019 | Um | |
| 2020/0180642 A1 * | 6/2020 | Takashiro | |
| 2020/0257290 A1 | 8/2020 | Hashimoto et al. | |
| 2020/0369281 A1 * | 11/2020 | Sato | |
| 2020/0398849 A1 * | 12/2020 | Kanoh | |
| 2021/0122396 A1 | 4/2021 | Itou et al. | |
| 2022/0105942 A1 * | 4/2022 | Aso | |

(Continued)

FOREIGN PATENT DOCUMENTS

| | | |
|---|---|---|
| EP | 4 052 982 A1 | 9/2022 |
| JP | 2018-024393 A | 2/2018 |

(Continued)

*Primary Examiner* — Ashley L Redhead, Jr.
(74) *Attorney, Agent, or Firm* — Sughrue Mion, PLLC

(57) ABSTRACT

A vehicle controller includes a processor configured to execute stop control to stop a host vehicle in a first lane on which the vehicle is traveling or continuation control to continue entry of the host vehicle into a second lane merged with the first lane and to transfer driving control to a driver, upon interruption of merging control during execution of the merging control, interrupt the merging control and execute set control out of the stop control and the continuation control, when an interruption condition is satisfied during execution of the merging control, change the set control to the continuation control, depending on continuation operation performed by the driver during execution of the stop control, and change the set control to the stop control, depending on stop operation performed by the driver during execution of the continuation control.

11 Claims, 9 Drawing Sheets

(56) References Cited

U.S. PATENT DOCUMENTS

2022/0340166 A1* 10/2022 Kume
2023/0294700 A1*  9/2023 Omagari
2025/0074417 A1*  3/2025 Kumazaki

FOREIGN PATENT DOCUMENTS

| | | |
|---|---|---|
| JP | 2019-149144 A | 9/2019 |
| JP | 2020-006818 A | 1/2020 |
| JP | 6838718 B2 | 3/2021 |
| JP | 2022-134541 A | 9/2022 |
| JP | 2022-154224 A | 10/2022 |
| WO | 2017/203691 A1 | 11/2017 |
| WO | 2019/163121 A1 | 8/2019 |

* cited by examiner

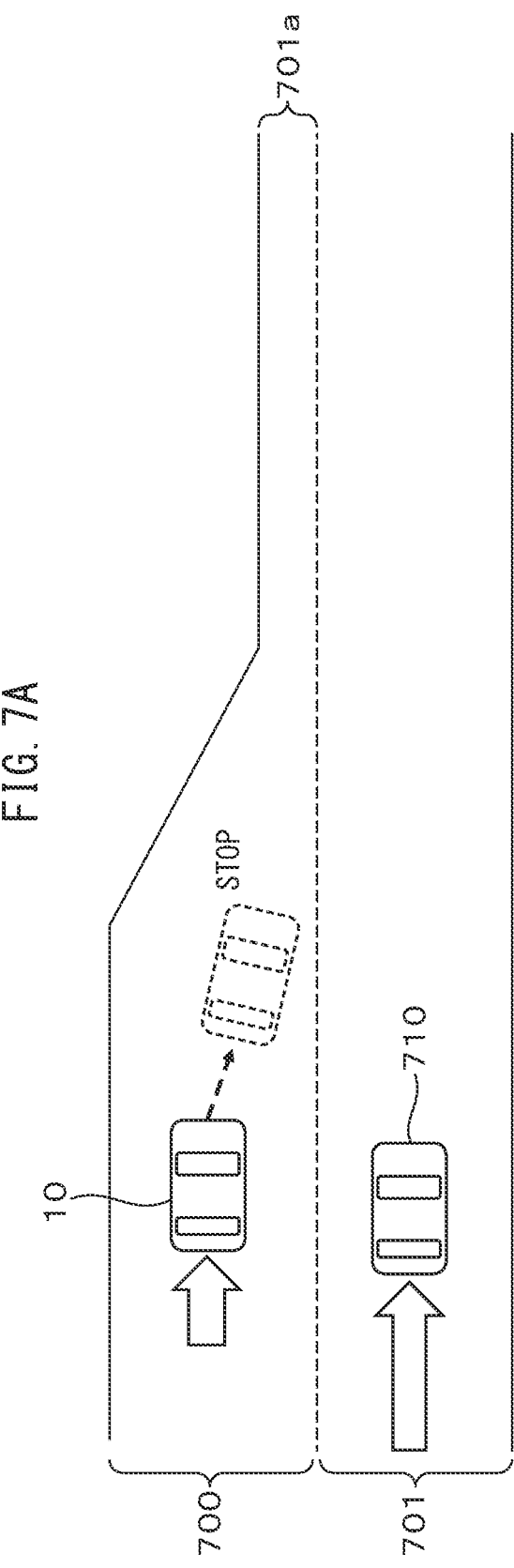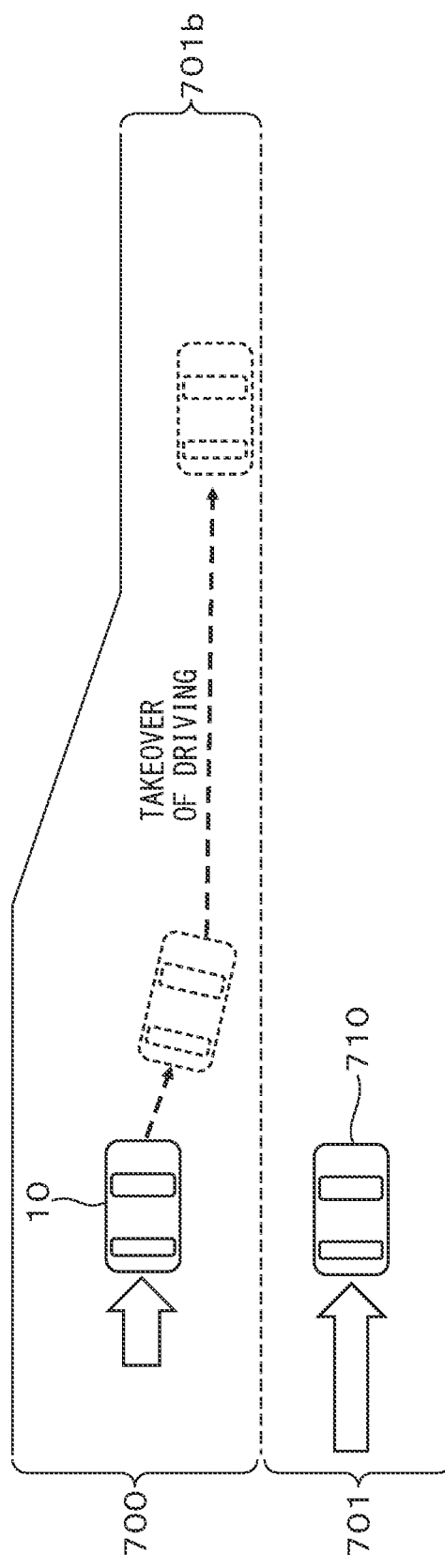

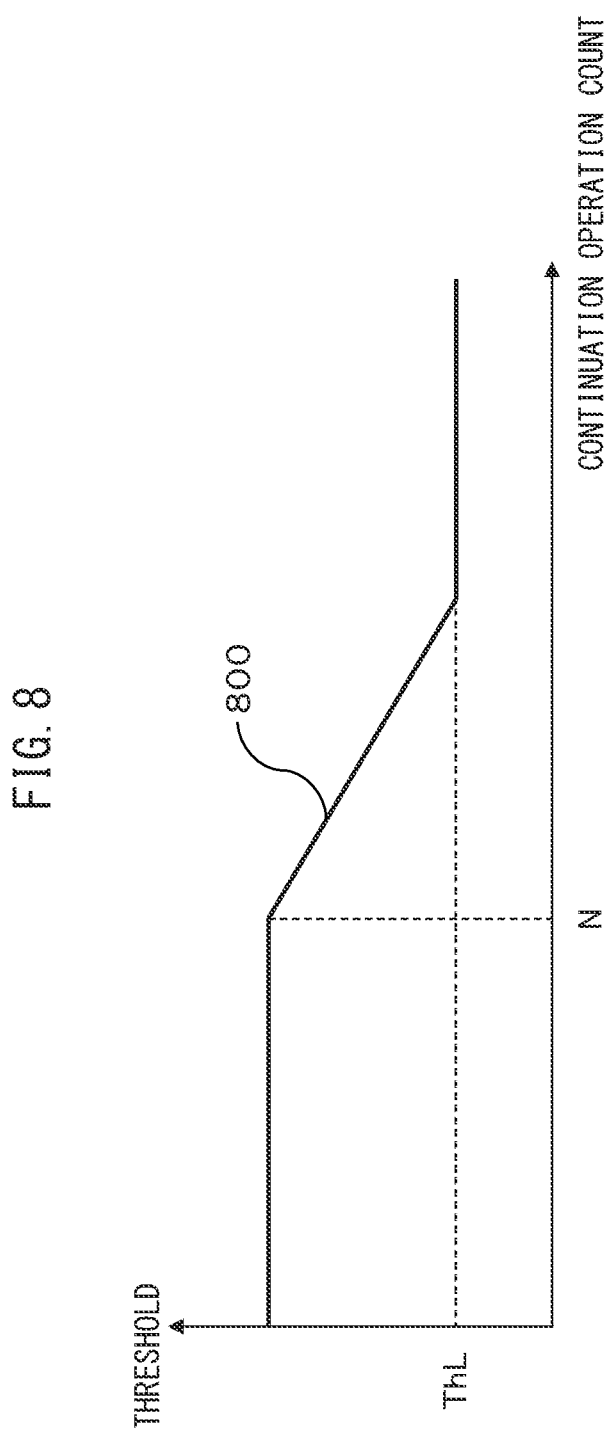

VEHICLE CONTROLLER, METHOD, AND COMPUTER PROGRAM FOR VEHICLE CONTROL

FIELD

The present invention relates to a vehicle controller, a method, and a computer program for vehicle control.

BACKGROUND

A technique to cause a vehicle to make a lane change under autonomous driving control has been researched (see International Publication WO2019/163121A).

A vehicle control system described in WO2019/163121A determines whether a host vehicle satisfies a condition for a lane change from a host vehicle lane to an adjacent lane, based on the situation around the host vehicle, and, when the condition is satisfied, controls acceleration or deceleration and steering of the host vehicle to cause the host vehicle to make a lane change to the adjacent lane. When the speed of the host vehicle is not greater than a predetermined speed, the vehicle control system stops the lane change control. However, when a driver's operation of an operation unit for adjusting the travel direction of the host vehicle is detected, the vehicle control system does not stop the lane change control.

SUMMARY

Depending on the positional relationship between a host vehicle and another vehicle traveling in the vicinity of the host vehicle, continuation of lane change control may make the driver of the host vehicle feel uneasy. In such a case, it is preferable to stop executing lane change control even after the start of the lane change control. However, conditions in which continuation of lane change control makes drivers feel uneasy vary from driver to driver. Thus, if the condition for stopping lane change control is not appropriately set for a driver, started lane change control may be stopped although the driver is not feeling uneasy. In such a case, the driver's convenience may be compromised. Conversely, continuation of lane change control may make the driver feel uneasy.

It is an object of the present invention to provide a vehicle controller that can determine whether to continue control to change lanes to be traveled by the vehicle appropriately.

According to an embodiment, a vehicle controller is provided. The vehicle controller includes a processor configured to: detect, when a first lane on which a host vehicle is traveling merges with a second lane, a relative position and a relative speed between the host vehicle and another vehicle traveling on the second lane, execute merging control of the host vehicle to make the host vehicle enter the second lane, execute, when the merging control is interrupted, stop control to stop the host vehicle in the first lane or continuation control to continue entry of the host vehicle into the second lane and to transfer driving control to a driver of the host vehicle, determine whether at least one of the detected relative position and the detected relative speed satisfies an interruption condition during execution of the merging control, interrupt the merging control and execute set control out of the stop control and the continuation control, when the interruption condition is satisfied, change the set control to the continuation control, depending on continuation operation performed by the driver during execution of the stop control to continue entry of the host vehicle into the second lane, and change the set control to the stop control, depending on stop operation performed by the driver during execution of the continuation control to stop the host vehicle.

The processor of the vehicle controller preferably does not change the set control until the number of times of the continuation operation or the number of times of the stop operation exceeds a predetermined number, changes the set control to the continuation control when the number of times of the continuation operation performed during execution of the stop control exceeds the predetermined number, and changes the set control to the stop control when the number of times of the stop operation performed during execution of the continuation control exceeds the predetermined number.

In addition, the processor of the vehicle controller preferably changes the set control to the continuation control when the ratio of the number of times of the continuation operation performed during execution of the stop control to the number of times of execution of the stop control exceeds a predetermined ratio.

In this case, the processor preferably changes the increment of the number of times for the case where the continuation operation is performed by the driver during execution of the stop control, depending on the situation around the host vehicle at the time of the continuation operation.

The vehicle controller preferably further includes a memory configured to store control information indicating the set control out of the stop control and the continuation control for each predetermined situation. The processor preferably identifies the set control corresponding to the situation around the host vehicle by referring to the control information.

According to another embodiment, a vehicle controller is provided. The vehicle controller includes a processor configured to: detect, when a first lane on which a host vehicle is traveling merges with a second lane, a relative position and a relative speed between the host vehicle and another vehicle traveling on the second lane, execute merging control of the host vehicle to make the host vehicle enter the second lane, execute, when the merging control is interrupted, stop control to stop the host vehicle in the first lane or continuation control to continue entry of the host vehicle into the second lane and to transfer driving control to a driver of the host vehicle; and a memory configured to store regional information indicating a region where the stop control is executed and a region where the continuation control is executed. The processor determines whether at least one of the detected relative position and the detected relative speed satisfies an interruption condition during execution of the merging control, and when the interruption condition is satisfied, the processor identifies control to be applied out of the stop control and the continuation control by referring to the position of the host vehicle and the regional information, interrupts the merging control and executes the identified control.

According to still another embodiment, a vehicle controller is provided. The vehicle controller includes a processor configured to: detect a relative position and a relative speed between a host vehicle and another vehicle traveling on an adjacent lane adjacent to a host vehicle lane on which the host vehicle is traveling, execute lane change control of the host vehicle, when a predetermined condition is satisfied, so that the host vehicle makes a lane change from the host vehicle lane to the adjacent lane, determine whether at least one of the detected relative position and the detected relative speed satisfies an interruption condition during execution of the lane change control, interrupt the lane change control when the interruption condition is satisfied, relax the interruption condition, depending on operation performed by a driver of the host vehicle before satisfaction of the interruption condition to interrupt the lane change control, and tighten the interruption condition, depending on operation performed by the driver at the time of satisfaction of the interruption condition to continue the lane change control.

The processor of the vehicle controller preferably does not change the interruption condition until the number of times of the operation to continue or the number of times of the operation to interrupt exceeds a predetermined number.

The vehicle controller preferably further includes a memory configured to store, for each predetermined situation, the interruption condition corresponding to the situation. In this case, the processor preferably determines whether at least one of the detected relative position and the detected relative speed satisfies the interruption condition corresponding to the situation around the host vehicle.

According to another embodiment, a method for vehicle control is provided. The method includes: detecting, when a first lane on which a host vehicle is traveling merges with a second lane, a relative position and a relative speed between the host vehicle and another vehicle traveling on the second lane; executing merging control of the host vehicle to make the host vehicle enter the second lane; executing, when the merging control is interrupted, stop control to stop the host vehicle in the first lane or continuation control to continue entry of the host vehicle into the second lane and to transfer driving control to a driver of the host vehicle; determining whether at least one of the change in the detected relative position and the detected relative speed satisfies an interruption condition during execution of the merging control; interrupting the merging control and executing set control out of the stop control and the continuation control, when the interruption condition is satisfied; changing the set control to the continuation control, depending on continuation operation performed by the driver during execution of the stop control to continue entry of the host vehicle into the second lane; and changing the set control to the stop control, depending on stop operation performed by the driver during execution of the continuation control to stop the host vehicle.

According to still another embodiment, a non-transitory recording medium that stores a computer program for vehicle control is provided. The computer program causes a processor mounted on a host vehicle to execute a process including: detecting, when a first lane on which the host vehicle is traveling merges with a second lane, a relative position and a relative speed between the host vehicle and another vehicle traveling on the second lane; executing merging control of the host vehicle to make the host vehicle enter the second lane; executing, when the merging control is interrupted, stop control to stop the host vehicle in the first lane or continuation control to continue entry of the host vehicle into the second lane and to transfer driving control to a driver of the host vehicle; determining whether at least one of the change in the detected relative position and the detected relative speed satisfies an interruption condition during execution of the merging control; interrupting the merging control and executing set control out of the stop control and the continuation control, when the interruption condition is satisfied; changing the set control to the continuation control, depending on continuation operation performed by the driver during execution of the stop control to continue entry of the host vehicle into the second lane; and changing the set control to the stop control, depending on stop operation performed by the driver during execution of the continuation control to stop the host vehicle.

The vehicle controller according to the present disclosure has an advantageous effect of being able to determine whether to continue control to change lanes to be traveled by the vehicle appropriately.

BRIEF DESCRIPTION OF DRAWINGS

FIG. 7A illustrates an example of initial setting of stop control and continuation control according to a modified example.

FIG. 7B illustrates an example of initial setting of stop control and continuation control according to a modified example.

FIG. 8 illustrates the relationship between a continuation operation count and a time threshold according to a second embodiment.

DESCRIPTION OF EMBODIMENTS

A vehicle controller, a method for vehicle control executed by the vehicle controller, and a computer program for vehicle control will now be described with reference to the attached drawings. In one embodiment, when a lane on which a host vehicle is traveling (hereafter referred to as a "first lane" or a "host vehicle lane") merges with a second lane, the vehicle controller executes merging control of the host vehicle to make the host vehicle enter the second lane. When the merging control is interrupted because of, for example, a change in the positional relationship between the host vehicle and another vehicle traveling in its vicinity, the vehicle controller executes stop control to stop the host vehicle in the first lane or continuation control to continue entry into the second lane and to transfer driving control to a driver of the host vehicle. The vehicle controller changes the set control to the continuation control, depending on continuation operation performed by the driver during execution of the stop control to continue merging of the host vehicle, and changes the set control to the stop control, depending on stop operation performed by the driver during execution of the continuation control to stop the host vehicle. In another embodiment, the vehicle controller interrupts lane change control to cause a host vehicle to make a lane change from a host vehicle lane to an adjacent lane, when a set interruption condition based on at least one of the change in a relative position between the host vehicle and another vehicle traveling on the destination adjacent lane or a relative speed therebetween is satisfied during execution of the lane change control. The vehicle controller relaxes the interruption condition, depending on operation performed by a driver of the host vehicle before satisfaction of the interruption condition to interrupt the lane change control, and tightens the interruption condition, depending on operation performed by the driver at the time of satisfaction of the interruption condition to continue the lane change control.

Figure 1:
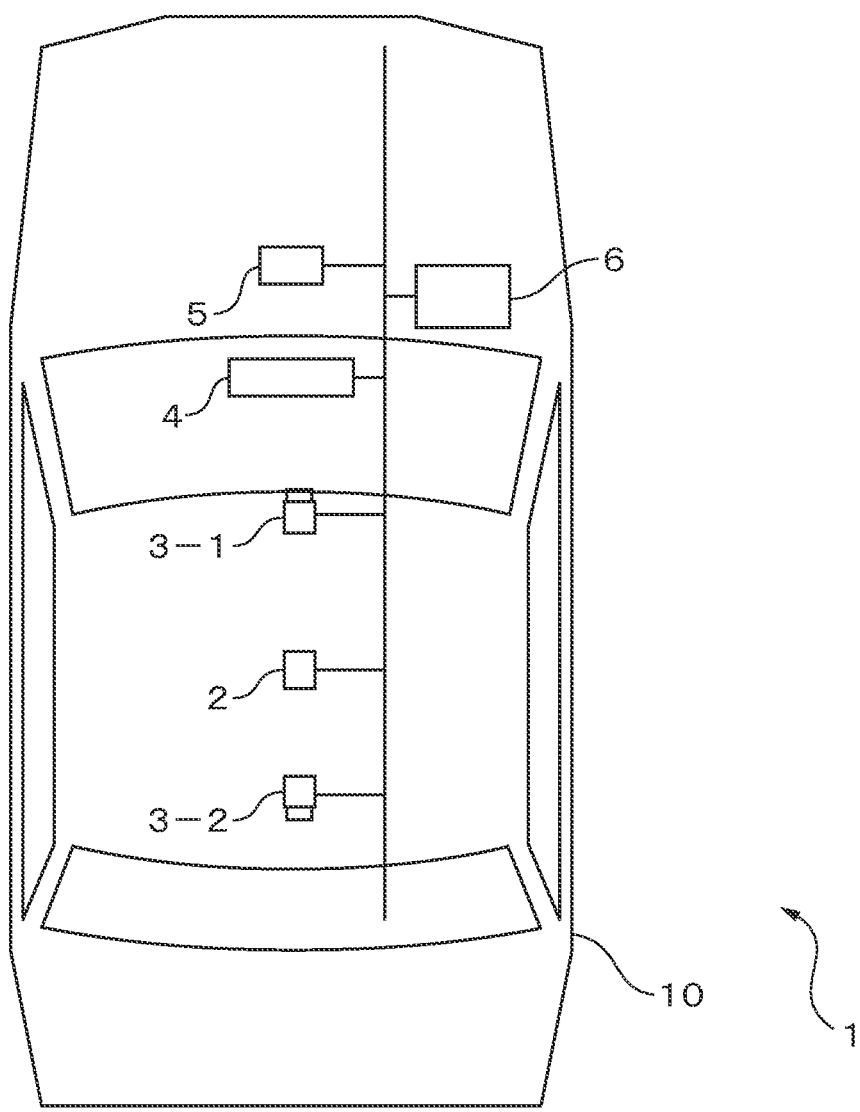
FIG. 1 schematically illustrates the configuration of a vehicle control system equipped with a vehicle controller.
Figure 2:
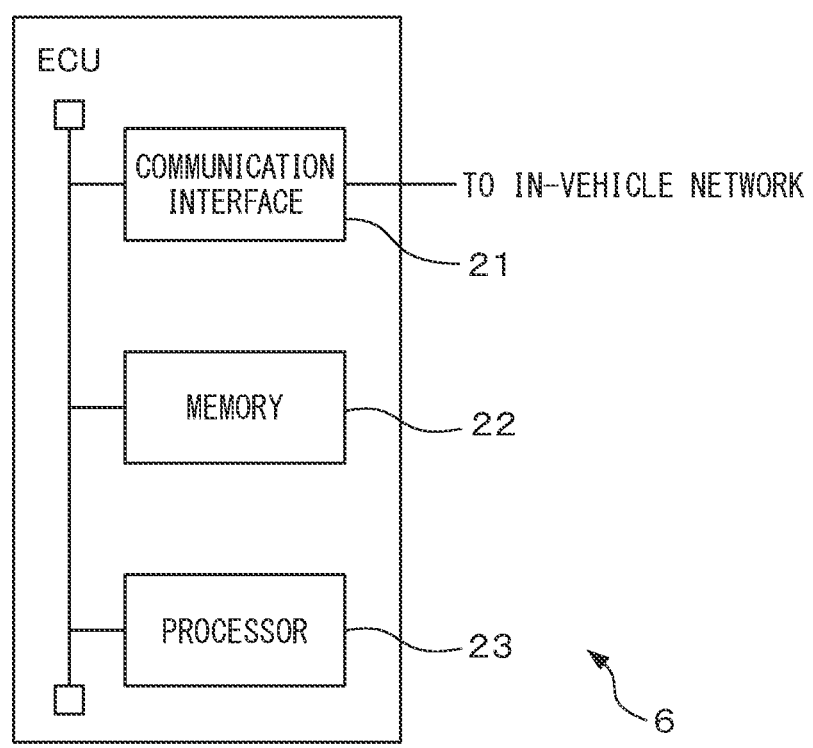
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. The vehicle control system 1 is mounted on a vehicle 10, which is an example of the host vehicle, and can execute autonomous driving control of the vehicle 10. To achieve this, the vehicle control system 1 includes a GPS receiver 2, two cameras 3-1 and 3-2, a user interface 4, a storage device 5, and an electronic control unit (ECU) 6, which is an example of the vehicle controller. The GPS receiver 2, the cameras 3-1 and 3-2, the user interface 4, and the storage device 5 are communicably connected to the ECU 6 via an in-vehicle network conforming to a standard such as a controller area network. The vehicle control system 1 may further include a navigation device (not illustrated) that searches for a planned travel route to a destination, a wireless communication terminal (not illustrated) for wireless communication with another device, or a range sensor (not illustrated), such as a LiDAR sensor or radar.

The GPS receiver 2, which is an example of a position determining device, receives GPS signals from GPS satellites at predetermined intervals, and determines the position of the vehicle 10, based on the received GPS signals. The GPS receiver 2 outputs positioning information indicating the result of determination of the position of the vehicle 10 based on the GPS signals to the ECU 6 via the in-vehicle network at predetermined intervals. Instead of the GPS receiver 2, the vehicle 10 may include a receiver conforming to another satellite positioning system. In this case, the receiver determines the position of the vehicle 10.

The two cameras 3-1 and 3-2 are examples of a sensor that can detect an object in the vicinity of the vehicle 10. The cameras 3-1 and 3-2 each include a two-dimensional detector constructed from an array of optoelectronic transducers, such as CCD or C-MOS, having sensitivity to visible light and a focusing optical system that forms an image of a target region on the two-dimensional detector. The camera 3-1 is mounted, for example, in the interior of the vehicle 10 so as to be oriented, for example, to the front of the vehicle 10. The camera 3-1 takes pictures of a region in front of the vehicle 10 every predetermined capturing period, and generates images representing the region. Similarly, the camera 3-2 is mounted, for example, in the interior of the vehicle 10 so as to be oriented to the rear of the vehicle 10. The camera 3-2 takes pictures of a region behind the vehicle 10 every predetermined capturing period, and generates images representing the region. Each image obtained by the cameras 3-1 and 3-2 is an example of a sensor signal, and may be a color or grayscale image. The vehicle 10 may include three or more cameras taking pictures in different orientations or having different focal lengths.

Every time an image is generated, the cameras 3-1 and 3-2 each output the generated image to the ECU 6 via the in-vehicle network.

The user interface 4, which is an example of a notification unit, includes, for example, a display, such as a liquid crystal display, or a touch screen display. The user interface 4 is mounted in the interior of the vehicle 10, e.g., near an instrument panel, so as to face the driver. The user interface 4 displays predetermined information received from the ECU 6 via the in-vehicle network, in the form of an icon or text, to notify the driver of the information. The user interface 4 may include one or more light sources provided on the instrument panel, a speaker mounted in the vehicle interior, or a vibrator provided in the steering or the driver's seat. In this case, the user interface 4 outputs predetermined information received from the ECU 6 via the in-vehicle network, in the form of a voice signal, to notify the driver of the information. Alternatively, the user interface 4 may vibrate the vibrator according to a signal received from the ECU 6 via the in-vehicle network to notify the driver of the predetermined information with the vibration. Alternatively, the user interface 4 may light up or blink the light sources according to a signal received from the ECU 6 via the in-vehicle network to notify the driver of the predetermined information.

The user interface 4 is also an example of an operation unit on which predetermined operation is performed by the driver. For example, when the user interface 4 includes a touch screen, a signal indicating a region in the touch screen touched by the driver is outputted to the ECU 6. The user interface 4 may include one or more switches on which the predetermined operation is performed. In this case, when one of the one or more switches is operated, the user interface 4 outputs a signal indicating the operated switch and the state after the operation of the switch to the ECU 6. The user interface 4 may further include a microphone. In this case, the user interface 4 outputs a voice signal representing the driver's voice collected via the microphone to the ECU 6.

The storage device 5, which is an example of the storage unit, includes, for example, a hard disk drive, a nonvolatile semiconductor memory, or an optical medium and an access device therefor. The storage device 5 stores a high-precision map, which is an example of map information. The high-precision map includes information used for autonomous driving control about individual road sections in the region represented in the high-precision map. The information used for autonomous driving control includes, for example, information indicating road markings, such as lane lines or stop lines, signposts, and features around roads of each road section.

The storage device 5 may further include a processor for executing, for example, a process to update the high-precision map and a process related to a request from the ECU 6 to read out the high-precision map. For example, every time the vehicle 10 moves a predetermined distance, the storage device 5 transmits a request to obtain a high-precision map, together with the current position of the vehicle 10, to a map server via a wireless communication terminal (not illustrated). Then the storage device 5 receives a high-precision map of a predetermined region around the current position of the vehicle 10 from the map server via the wireless communication terminal. When receiving a request from the ECU 6 to read out the high-precision map, the storage device 5 cuts out that portion of the high-precision map stored therein which includes the current position of the vehicle 10 and which represents a region smaller than the predetermined region, and outputs the cutout portion to the ECU 6 via the in-vehicle network.

The ECU 6 can execute autonomous driving control of the vehicle 10. In particular, the ECU 6 executes control of a lane change from a host vehicle lane on which the vehicle 10 is traveling to an adjacent lane adjacent to the host vehicle lane. The lane change control also includes the merging control.

As illustrated in FIG. 2, the ECU 6 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 6 to the in-vehicle network. Every time positioning information is received from the GPS receiver 2, the communication interface 21 passes the received positioning information to the processor 23. Every time an image is received from the camera 3-1 or 3-2, the communication interface 21 passes the received image to the processor 23. In addition, the communication interface 21 passes the high-precision map read from the storage device 5 to the processor 23. Further, the communication interface 21 outputs information or a signal addressed to the user interface 4 received from the processor 23 to the user interface 4 via the in-vehicle network. Further, every time a signal indicating the driver's predetermined operation is received from the user interface 4, the communication interface 21 passes the signal to the processor 23.

The memory 22, which is another example of the storage unit, includes, for example, volatile and nonvolatile semiconductor memories. The memory 22 stores various types of data used in a vehicle control process executed by the processor 23 of the ECU 6. For example, the memory 22 stores an interruption condition for determining whether to interrupt control for a lane change and a control flag indicating the type of control executed when the interruption condition is satisfied. The control flag is an example of the control information. The memory 22 further stores a high-precision map read from the storage device 5. In addition, the memory 22 temporarily stores images received from the camera 3-1 or 3-2, positioning information received from the GPS receiver 2, and various types of data generated during the vehicle control process. Such data includes a count value indicating the number of times of operation performed by the driver during particular control and the number of times of execution of the particular control.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10.

Figure 3:
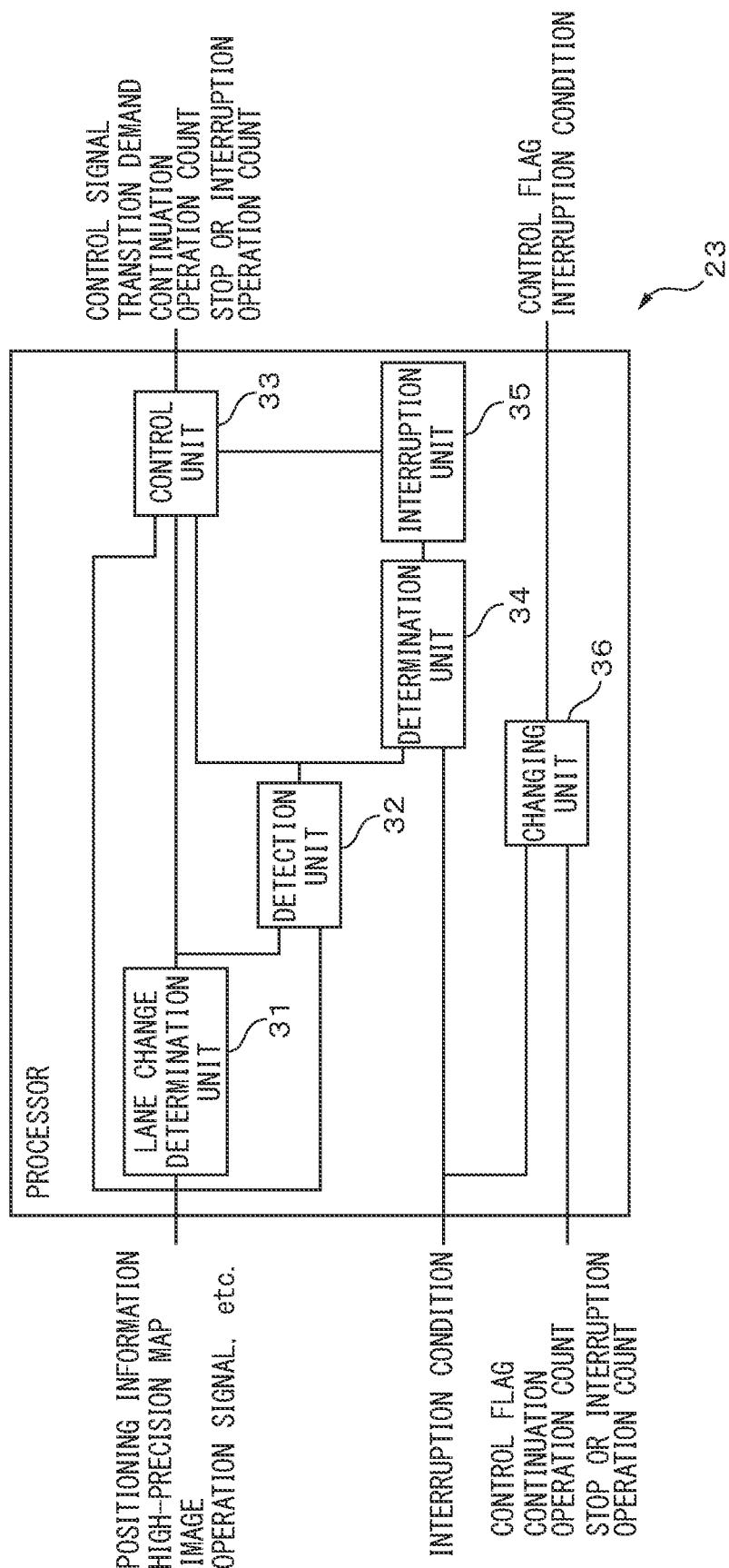
FIG. 3 is a functional block diagram of a processor of the electronic control unit, related to a vehicle control process.

FIG. 3 is a functional block diagram of the processor 23, related to the vehicle control process. The processor 23 includes a lane change determination unit 31, a detection unit 32, a control unit 33, a determination unit 34, an interruption unit 35, and a changing unit 36. These units included in the processor 23 are functional modules, for example, implemented by a computer program executed by the processor 23, or may be dedicated operating circuits provided in the processor 23.

The following describes a case in which merging control, which is executed when a host vehicle lane merges with an adjacent lane, is applied (first embodiment) and a case in which lane change control is applied when a predetermined condition is satisfied regardless of whether a host vehicle lane merges with an adjacent lane (second embodiment). The merging control is an example of the lane change control.

First Embodiment

First, a first embodiment in which merging control is applied will be described.

The lane change determination unit 31 determines whether to apply merging control to the vehicle 10. To achieve this, the lane change determination unit 31 determines the position of the vehicle 10 indicated by the latest positioning information as the current position of the vehicle 10. The lane change determination unit 31 identifies the travel direction of the vehicle 10, based on the changes in the position of the vehicle 10 indicated by the latest pieces of positioning information or on a sensor signal indicating the orientation of the vehicle 10 received by the ECU 6 from an orientation sensor (not illustrated) mounted on the vehicle 10. Then the lane change determination unit 31 identifies the road including the current position of the vehicle 10 as the road being traveled by the vehicle 10, by referring to the high-precision map. In addition, the lane change determination unit 31 determines whether there is a merging point at which the road being traveled by the vehicle 10 merges with another road, in a section from the current position of the vehicle 10 to a predetermined distance (e.g., several hundred meters) away in the travel direction of the vehicle 10, by referring to the high-precision map. When there is a merging point, the lane change determination unit 31 determines that a predetermined condition for applying merging control is satisfied, and determines to apply merging control to the vehicle 10. The lane change determination unit 31 further determines whether the road being traveled by the vehicle 10 merges with the destination road from the left or right at the merging point, by referring to the high-precision map. When there is not a merging point in a section from the current position of the vehicle 10 to a predetermined distance (e.g., several hundred meters) away, the lane change determination unit 31 determines not to apply merging control to the vehicle 10 at the stage.

When determining to apply merging control to the vehicle 10, the lane change determination unit 31 notifies the result of the determination and the bearing of the destination road viewed from the road being traveled by the vehicle 10 (right or left) to the detection unit 32, the control unit 33, the determination unit 34, the interruption unit 35, and the changing unit 36.

The detection unit 32 detects another vehicle traveling in the vicinity of the vehicle 10 (hereafter referred to as a "target vehicle" for convenience of description), and further detects a relative position and a relative speed between the target vehicle and the vehicle 10. In particular, the detection unit 32 detects a relative position and a relative speed between the vehicle 10 and a target vehicle traveling on an adjacent lane merged with a host vehicle lane (hereafter simply an "adjacent lane"). Specifically, the detection unit 32 inputs images obtained from the cameras 3-1 and 3-2 into a classifier to detect a target vehicle. As such a classifier, the detection unit 32 can use a deep neural network (DNN) having architecture of a convolutional neural network (CNN) type, such as Single Shot MultiBox Detector (SSD) or Faster R-CNN. Alternatively, as such a classifier, the detection unit 32 may use a DNN having architecture of a self-attention network (SAN) type, or a classifier based on another machine learning technique, such as an AdaBoost classifier. Such a classifier is trained in advance with a large number of training images representing vehicles in accordance with a predetermined training technique, such as backpropagation, so as to detect a target vehicle from an image. The classifier outputs information for identifying an object region including a target vehicle detected in the inputted image and information indicating the type of the detected target vehicle (e.g., an ordinary passenger car, a large-size vehicle, or a two-wheeler).

When a target vehicle is detected, the detection unit 32 determines whether the target vehicle is traveling on the adjacent lane. The bottom position of the object region including the target vehicle is assumed to correspond to the position where the target vehicle is in contact with the road surface. The positions in an image correspond one-to-one to the directions viewed from the camera that generated the image. Thus the detection unit 32 can estimate the distance from the camera that generated the image to the target vehicle and the direction from the vehicle 10 to the target vehicle, by referring to the bottom position of the object region in the image and parameters of the camera, such as the height of the mounted position and the orientation. Alternatively, the detection unit 32 may estimate the distance from the camera that generated the image to the target vehicle, based on the horizontal width of the object region including the target vehicle and the number of reference pixels in an image corresponding to a reference vehicle width of the type of the target vehicle for the case where the distance between the vehicles is a reference distance.

In the case where the vehicle 10 is equipped with a range sensor (not illustrated), the detection unit 32 may detect a target vehicle, based on a ranging signal. In this case also, the detection unit 32 inputs a ranging signal into a classifier that has been trained to detect a target vehicle from a ranging signal, thereby detecting a target vehicle. As the classifier for detecting a target vehicle from a ranging signal, the detection unit 32 can use a DNN having architecture of a CNN or SAN type. Alternatively, the detection unit 32 may detect a target vehicle in accordance with another technique to detect a target vehicle from a ranging signal. In this case, the detection unit 32 determines the direction in which the target vehicle is detected in the ranging signal as the direction from the vehicle 10 to the target vehicle. Further, the detection unit 32 determines the distance indicated by the ranging signal in the direction as an estimated distance from the vehicle 10 to the target vehicle.

Based on the estimated direction and distance, the detection unit 32 estimates the distance from the vehicle 10 to the target vehicle along a direction perpendicular to the travel direction of the vehicle 10 (hereafter referred to as the "lateral distance" for convenience of description). In the case where the lateral distance is within a predetermined distance range corresponding to the width of the adjacent lane at the current position of the vehicle 10 and where the direction from the vehicle 10 to the target vehicle is the same as the bearing of the destination adjacent lane relative to the host vehicle lane, the detection unit 32 determines that the target vehicle is traveling on the adjacent lane. For example, when the host vehicle lane merges with the right adjacent lane, the detection unit 32 determines that a target vehicle on the right of the vehicle 10 whose lateral distance is within the predetermined distance range is traveling on the adjacent lane. The detection unit 32 identifies the predetermined distance range at the current position of the vehicle 10 by referring to the high-precision map.

Alternatively, the detection unit 32 may detect lane lines represented in an image, together with a target vehicle, by inputting the image into the classifier. In this case, the classifier is trained in advance so that lane lines can also be detected. The detection unit 32 identifies a region sandwiched between two lane lines in ascending order of distance from the position of the vehicle 10 in the image in the bearing of the destination of merging (right or left) as a region representing the adjacent lane in the image. When the bottom of the object region representing the target vehicle is within the region corresponding to the adjacent lane, the detection unit 32 determines that the target vehicle is traveling on the adjacent lane.

The detection unit 32 executes the above-described processing on time-series images generated by the camera 3-1 or 3-2 or time-series ranging signals generated by the range sensor to estimate the positions of the target vehicle relative to the vehicle 10 at the times of generation of the images or the ranging signals. In addition, the detection unit 32 determines the change in the position of the target vehicle relative to the vehicle 10 from the relative positions at the times of generation of the individual images or ranging signals in the most recent certain period arranged in chronological order, and estimates the speed of the target vehicle relative to the vehicle 10, based on the change in the relative position.

When multiple target vehicles are detected, the detection unit 32 applies a predetermined tracking technique, such as KLT tracking, to track the individual target vehicles over the time-series images or ranging signals. For each target vehicle being tracked, the detection unit 32 estimates the position and speed of the target vehicle relative to the vehicle 10.

For each target vehicle determined to be traveling on the destination adjacent lane, the detection unit 32 notifies the position and speed of the target vehicle relative to the vehicle 10 to the control unit 33 and the determination unit 34.

When notified by the lane change determination unit 31 of the result of determination that merging control is to be applied to the vehicle 10, the control unit 33 executes merging control to make the vehicle 10 enter the adjacent lane. In addition, when instructed by the interruption unit 35 to interrupt merging control during execution of merging control, the control unit 33 interrupts the merging control and executes control specified by the interruption unit 35 (stop control or continuation control).

When executing merging control, the control unit 33 identifies a section ahead in the travel direction of the vehicle 10 where a lane change from the host vehicle lane to the adjacent lane can be made (hereafter a "merging section") by referring to the high-precision map. The control unit 33 then sets a planned trajectory such that the vehicle 10 will move from the host vehicle lane to the adjacent lane in the merging section. Upon setting a planned trajectory, the control unit 33 controls components of the vehicle 10 so that the vehicle 10 travels along the planned trajectory. To achieve this, the control unit 33 measures the position of the vehicle 10 at predetermined intervals, and compares the measured position of the vehicle 10 with the planned trajectory. The control unit 33 measures the correct position of the vehicle 10 by comparing an image obtained by the camera 3-1 or 3-2 with the high-precision map. When the measured position of the vehicle 10 is on the planned trajectory, the control unit 33 determines the steering angle of the vehicle 10 so that the vehicle 10 moves along the planned trajectory, and controls the steering of the vehicle 10 so that the steering angle is the same as determined. When the measured position of the vehicle 10 is apart from the planned trajectory, the control unit 33 determines the steering angle of the vehicle 10 so that the vehicle 10 approaches the planned trajectory, and controls the steering of the vehicle 10 so that the steering angle is the same as determined.

In the case where there is a target vehicle traveling on the adjacent lane ahead of or beside the vehicle 10, the control unit 33 sets the acceleration or deceleration of the vehicle 10 so that the distance between the target vehicle and the vehicle 10 will not be less than a predetermined distance threshold when the vehicle 10 enters the adjacent lane. To this end, the control unit 33 refers to the relative position and the relative speed of the target vehicle detected by the detection unit 32. When the distance between the vehicle 10 and the target vehicle in the travel direction of the vehicle 10, which is determined from the relative position between the vehicle 10 and the target vehicle, is less than the distance threshold, the control unit 33 reduces the speed of the vehicle 10 below that of the target vehicle, based on the relative speed. When the distance between the vehicle 10 and the target vehicle in the travel direction of the vehicle 10 is not less than the distance threshold, the control unit 33 sets acceleration or deceleration, based on the relative speed, so that the vehicle 10 is as fast as or slower than the target vehicle.

The control unit 33 sets the degree of accelerator opening or the amount of braking according to the set acceleration or deceleration. The control unit 33 determines the amount of fuel injection according to the set degree of accelerator opening, and outputs a control signal depending on the amount of fuel injection to a fuel injector of an engine of the vehicle 10. Alternatively, the control unit 33 determines electric power to be supplied to a motor according to the set degree of accelerator opening, and controls a driving circuit of the motor so that the determined electric power is supplied to the motor. Alternatively, the control unit 33 outputs a control signal depending on the set amount of braking to the brake of the vehicle 10.

When the vehicle 10 starts to travel completely inside the adjacent lane, the control unit 33 finishes merging control.

When measuring the correct position of the vehicle 10, the control unit 33 projects features on or around the road detected from an image onto the high-precision map or features on or around the road in the vicinity of the vehicle 10 represented in the high-precision map onto the image, assuming the position and orientation of the vehicle 10. The features on or around the road may be, for example, road markings such as lane lines or stop lines, or curbstones. The control unit 33 then estimates the actual position of the vehicle 10 to be the position and orientation of the vehicle 10 for the case where the features detected from the image match those represented in the high-precision map the best.

The control unit 33 uses initial values of the assumed position and orientation of the vehicle 10 and parameters of the camera that generated the image, such as the focal length, the height of the mounted position, and the orientation, to determine the positions in the high-precision map or the image to which the features are projected. As the initial values of the position and orientation of the vehicle 10 is used the latest position of the vehicle 10 measured by the GPS receiver 2 or the position obtained by correcting, with odometry information, the position and orientation of the vehicle 10 measured last time. The control unit 33 then calculates the degree of matching between the features on or around the road detected from the image and corresponding features represented in the map (e.g., the inverse of the sum of squares of the distances between corresponding features).

The control unit 33 repeats the above-described processing while varying the assumed position and orientation of the vehicle 10, and estimates the actual position of the vehicle 10 to be the assumed position and orientation for the case where the degree of matching is a maximum.

The control unit 33 inputs an image into a classifier that has been trained to detect detection target features from an image, thereby detecting these features. As such a classifier, the control unit 33 can use one similar to the classifier used for detecting a target vehicle, which is described in relation to the detection unit 32. Alternatively, the classifier used by the detection unit 32 may detect features as well as a target vehicle.

When instructed by the interruption unit 35 to interrupt merging control, the control unit 33 interrupts execution of the merging control. In addition, when instructed by the interruption unit 35 to execute stop control to stop the vehicle 10 in the host vehicle lane, the control unit 33 executes the stop control. In this case, the control unit 33 determines whether the vehicle 10 remains in the host vehicle lane or part of the vehicle 10 has entered the destination adjacent lane, by referring to the high-precision map and the correct position of the vehicle 10 measured by comparing an image with the high-precision map. When the vehicle 10 remains in the host vehicle lane, the control unit 33 decelerates the vehicle 10 at a predetermined deceleration so that the vehicle 10 may stop before entering the adjacent lane. To this end, the control unit 33 may set the steering angle to turn the vehicle 10 in a direction away from the adjacent lane, and control the steering of the vehicle 10 according to the set steering angle. When part of the vehicle 10 has entered the destination adjacent lane, the control unit 33 sets the steering angle to turn the vehicle 10 in a direction such that the vehicle will return to the host vehicle lane from the adjacent lane, and controls the steering of the vehicle 10 according to the set steering angle. Then the control unit 33 decelerates the vehicle 10 at a predetermined deceleration so that the vehicle 10 may stop after returning to the host vehicle lane.

When instructed by the interruption unit 35 to execute control continuation to continue entry of the vehicle 10 into the adjacent lane and to transfer driving control to the driver, the control unit 33 executes the continuation control. In this case, the control unit 33 keeps the steering as it is even when the vehicle 10 is moving along the planned trajectory from the host vehicle lane toward the adjacent lane. Further, the control unit 33 notifies the driver that driving control will be transferred to him/her (transition demand), via the user interface 4. Then, after sensing hold of the steering wheel by the driver via a touch sensor (not illustrated) provided in the steering or after sensing operation of the accelerator or brake by the driver, the control unit 33 transfers driving control to the driver. In the case where neither hold of the steering wheel, operation of the accelerator, nor operation of the brake by the driver is sensed even after a predetermined time from notification of the transition demand to the driver, the control unit 33 may execute stop control.

Figure 4A:
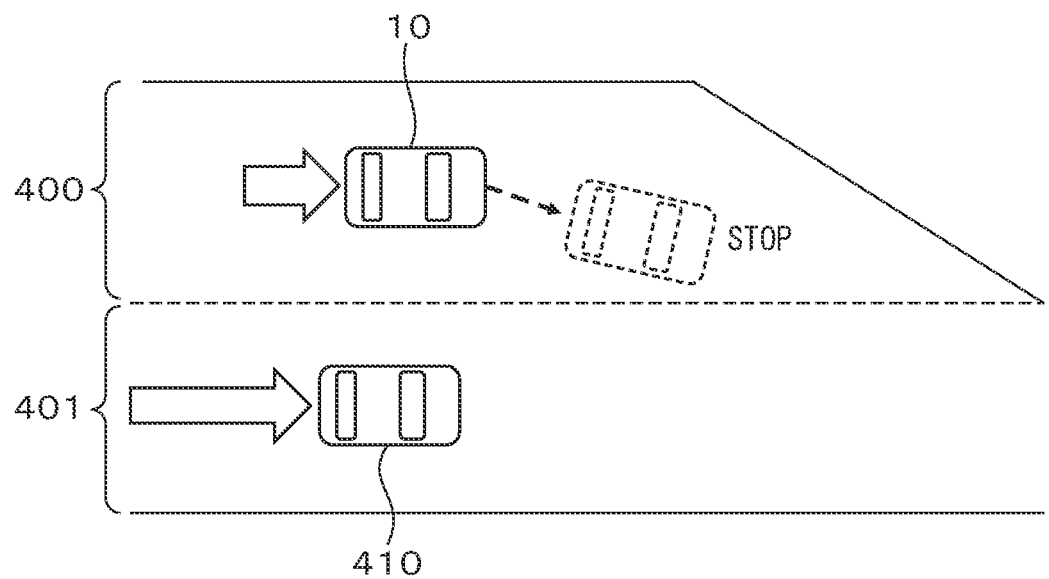
FIG. 4A is a schematic diagram for explaining stop control.
Figure 4B:
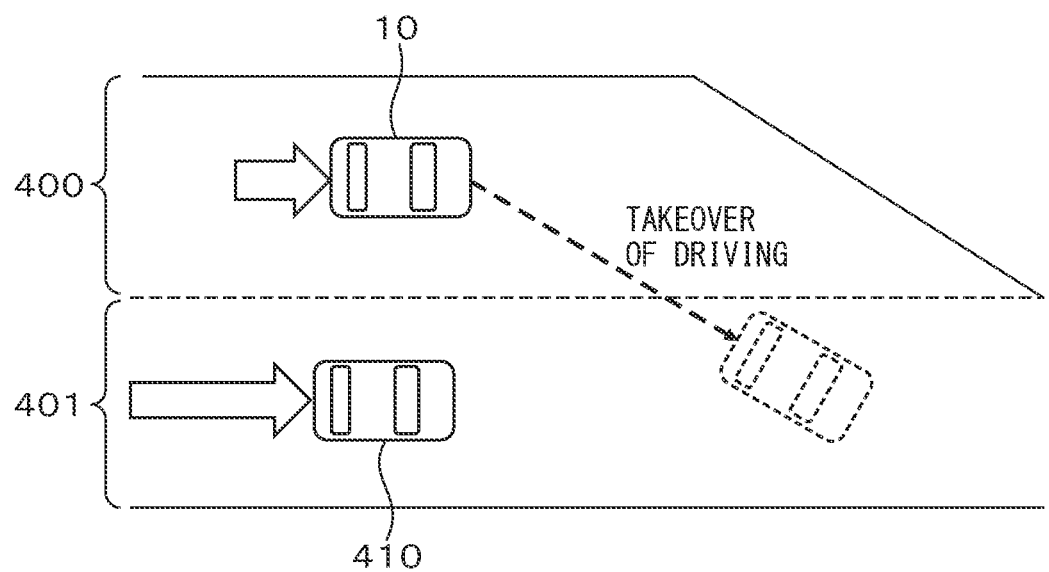
FIG. 4B is a schematic diagram for explaining continuation control.

FIGS. 4A and 4B are schematic diagrams for explaining stop control and continuation control, respectively. In the example illustrated in FIG. 4A, when a target vehicle 410 traveling on an adjacent lane 401 merged with a host vehicle lane 400 is so close to the vehicle 10 as to satisfy an interruption condition, merging control is interrupted. The vehicle 10 is then controlled to stop in the host vehicle lane 400.

In contrast, in the example illustrated in FIG. 4B, entry of the vehicle 10 into the adjacent lane 401 from the host vehicle lane 400 continues, while driving of the vehicle 10 is transferred to the driver, even after merging control is interrupted by the approach of the target vehicle 410.

In the case where continuation operation to continue entry of the vehicle 10 into the adjacent lane is performed by the driver during execution of stop control, the control unit 33 stops executing the stop control and thereafter controls the vehicle 10 according to the driver's operation. For example, when the steering angle by the driver's steering indicates that the vehicle 10 is moving toward the destination adjacent lane, the control unit 33 determines that the driver has performed continuation operation. Alternatively, when pressing down on the accelerator by the driver is sensed, the control unit 33 may determine that the driver has performed continuation operation. Then the control unit 33 increments, by one, a count value indicating the number of times of continuation operation performed by the driver during execution of stop control (hereafter a "continuation operation count").

Conversely, in the case where stop operation to stop the vehicle 10 is performed by the driver during execution of continuation control, the control unit 33 stops executing the continuation control and thereafter stops the vehicle 10 according to the driver's operation. For example, when the driver presses down on the brake more than a predetermined amount of braking, the control unit 33 determines that the driver has performed stop operation. Then the control unit 33 increments, by one, a count value indicating the number of times of stop operation performed by the driver during execution of continuation control (hereafter a "stop operation count").

The determination unit 34 determines whether at least one of the relative position and the relative speed between the vehicle 10 and a target vehicle traveling on the destination adjacent lane satisfies a predetermined interruption condition while the control unit 33 is executing merging control; the relative position and the relative speed are detected by the detection unit 32.

For example, the determination unit 34 determines the distance between the vehicle 10 and a target vehicle traveling behind the vehicle 10 on the adjacent lane, based on the relative position between the target vehicle and the vehicle 10. When the distance between the vehicles falls below a predetermined interruption determination threshold, the determination unit 34 determines that the interruption condition is satisfied. The determination unit 34 may predict the distance between the target vehicle and the vehicle 10 until a predetermined time ahead, by applying prediction processing, such as a Kalman Filter, to the change in the relative position between the target vehicle and the vehicle 10 in the most recent predetermined period. In the case where the predicted distance between the target vehicle and the vehicle 10 at a certain time falls below the interruption determination threshold, the determination unit 34 may determine that the interruption condition is satisfied. The interruption condition may be set as a combination of the distance and the relative speed between the target vehicle and the vehicle 10. For example, the interruption determination threshold may be set smaller as the relative speed between the target vehicle and the vehicle 10 is greater, when the target vehicle is faster than the vehicle 10. Further, in the case where the target vehicle traveling behind the vehicle 10 on the adjacent lane is faster than the vehicle 10 and where the relative speed between the target vehicle and the vehicle 10 is greater than a predetermined speed threshold, the determination unit 34 may determine that the interruption condition is satisfied, regardless of the distance between the target vehicle and the vehicle 10. Further, the determination unit 34 may determine a predicted time until a collision between the vehicle 10 and the target vehicle, based on the result of prediction of the distance between the target vehicle and the vehicle 10. When the predicted time falls below a predetermined time threshold, the determination unit 34 may determine that the interruption condition is satisfied.

When multiple target vehicles are traveling behind the vehicle 10 on the adjacent lane, the determination unit 34 only has to execute the above-described processing on the target vehicle closest to the vehicle 10 to determine whether the interruption condition is satisfied.

During execution of merging control, the distance between the vehicle 10 and a target vehicle traveling ahead of the vehicle 10 may decrease rapidly, for example, because the target vehicle suddenly decelerates. In view of this, the determination unit 34 determines whether the interruption condition is satisfied regarding a target vehicle traveling ahead of the vehicle 10, in the same manner as described above. However, as for the condition related to the relative speed, the determination unit 34 determines that the interruption condition is satisfied, when the speed of the target vehicle relative to the vehicle 10 is less than the predetermined speed threshold, unlike the condition for a vehicle behind. Further, the interruption condition for a target vehicle preceding the vehicle 10 may be set separately from the interruption condition for a target vehicle following the vehicle 10.

When determining that the interruption condition is satisfied, the determination unit 34 notifies the result of the determination to the interruption unit 35.

When receiving the result of determination that the interruption condition is satisfied from the determination unit 34, the interruption unit 35 refers to the control flag stored in the memory 22 and identifies control indicated by the control flag (stop control or continuation control). The interruption unit 35 notifies the identified control and an instruction to interrupt merging control to the control unit 33.

The changing unit 36 determines whether to change control to be applied at the time of satisfaction of the interruption condition from stop control to continuation control or from continuation control to stop control, by referring to the continuation operation count or the stop operation count stored in the memory 22, at predetermined timing. The predetermined timing may be the timing after a predetermined time from the completion or interruption of merging control. Alternatively, the predetermined timing may be the timing after a predetermined time from the driver's operation performed during stop control or continuation control executed after the interruption of merging control or the timing of the next turn-on or turn-off of an ignition switch of the vehicle 10.

For example, when the value of the control flag indicates execution of stop control, the changing unit 36 refers to the continuation operation count. When the continuation operation count exceeds a predetermined number, the changing unit 36 rewrites the value of the control flag to a value indicating execution of continuation control. The changing unit 36 then resets the continuation operation count to zero. Similarly, when the value of the control flag indicates execution of continuation control, the changing unit 36 refers to the stop operation count. When the stop operation count exceeds a predetermined number, the changing unit 36 rewrites the value of the control flag to a value indicating execution of stop control. The changing unit 36 then resets the stop operation count to zero.

Every time stop control after the interruption of merging control is finished without being stopped by the driver's operation, the changing unit 36 may reduce the value of the continuation operation count by a predetermined value (e.g., 0.5). To this end, the changing unit 36 may reduce the value of the continuation operation count only when stop control is finished multiple consecutive times without being stopped by the driver's operation. Similarly, every time continuation control after the interruption of merging control is finished without being stopped by the driver's operation, the changing unit 36 may reduce the value of the stop operation count by a predetermined value.

Figure 5:
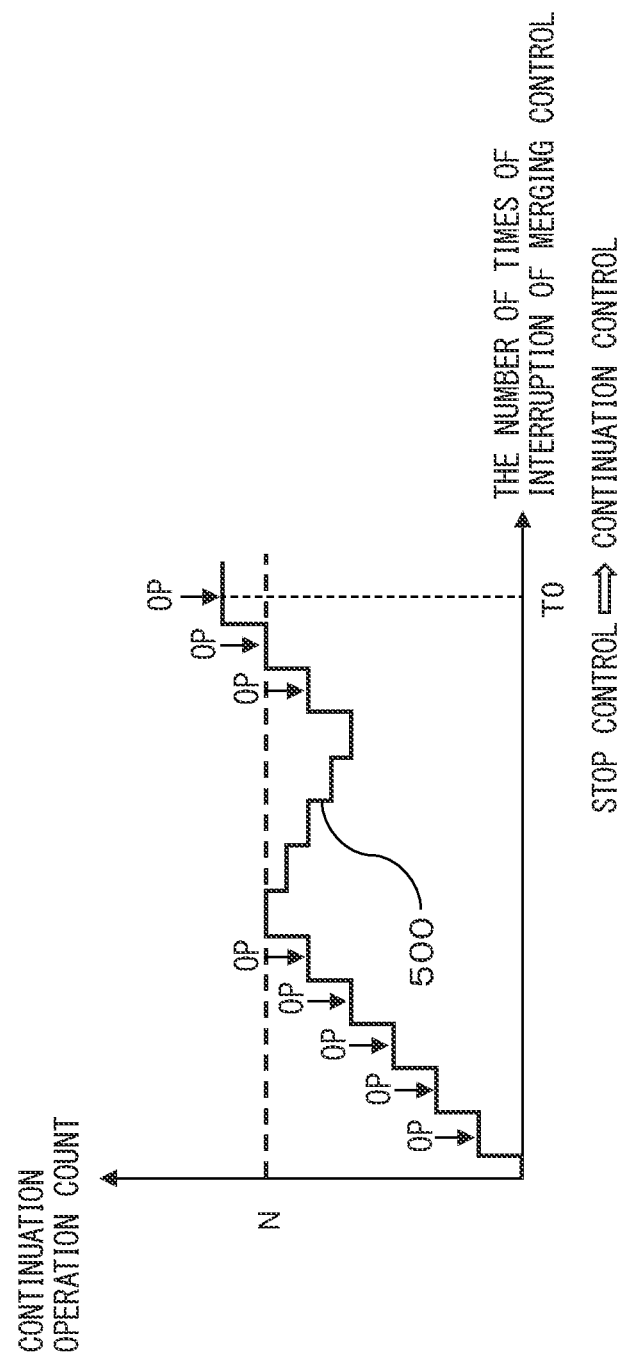
FIG. 5 illustrates an example of the relationship between the number of times of a driver's operation at the times of interruption of merging control and a switch between stop control and continuation control.

FIG. 5 illustrates an example of the relationship between the number of times of the driver's operation at the times of interruption of merging control and a switch between stop control and continuation control. In FIG. 5, the abscissa and the ordinate represent the number of times of interruption of merging control and the value of the continuation operation count, respectively. A graph 500 represents the change in the value of the continuation operation count.

As illustrated by the graph 500, the value of the continuation operation count increases every time the driver performs continuation operation to continue entry of the vehicle 10 into the destination adjacent lane (in FIG. 5, simply denoted by "op") at the time of interruption of merging control and execution of stop control. Conversely, the value of the continuation operation count decreases if the driver does not perform any operation at the time of interruption of merging control and execution of stop control. Then, at timing TO when the value of the continuation operation count exceeds a predetermined number N, control to be applied at the time of interruption of merging control is changed from stop control to continuation control.

In this way, the changing unit 36 can match the action of the vehicle 10 at the time of interruption of merging control to the driver's preferences, by determining which of stop control or continuation control is to be applied depending on the driver's operation during stop control or continuation control.

According to a modified example, when the value of the stop operation count exceeds the sum of the value of the continuation operation count and a predetermined number, the changing unit 36 may rewrite the value of the control flag to a value indicating execution of stop control. Similarly, when the value of the continuation operation count exceeds the sum of the value of the stop operation count and a predetermined number, the changing unit 36 may rewrite the value of the control flag to a value indicating execution of continuation control. In this case, the changing unit 36 may omit to reset the continuation operation count and the stop operation count even when the value of the control flag is rewritten.

According to another modified example, when the ratio of the continuation operation count to the number of times of execution of stop control exceeds a predetermined ratio, the changing unit 36 may rewrite the value of the control flag to a value indicating execution of continuation control. The changing unit 36 then resets the continuation operation count to zero. To prevent frequent switching between stop control and continuation control, the changing unit 36 preferably does not rewrite the value of the control flag until the number of times of execution of stop control exceeds a predetermined number. Similarly, when the ratio of the stop operation count to the number of times of execution of continuation control exceeds a predetermined ratio, the changing unit 36 may rewrite the value of the control flag to a value indicating execution of stop control. The changing unit 36 then resets the stop operation count to zero. In this case also, the changing unit 36 preferably does not rewrite the value of the control flag until the number of times of execution of continuation control exceeds a predetermined number.

Figure 6:
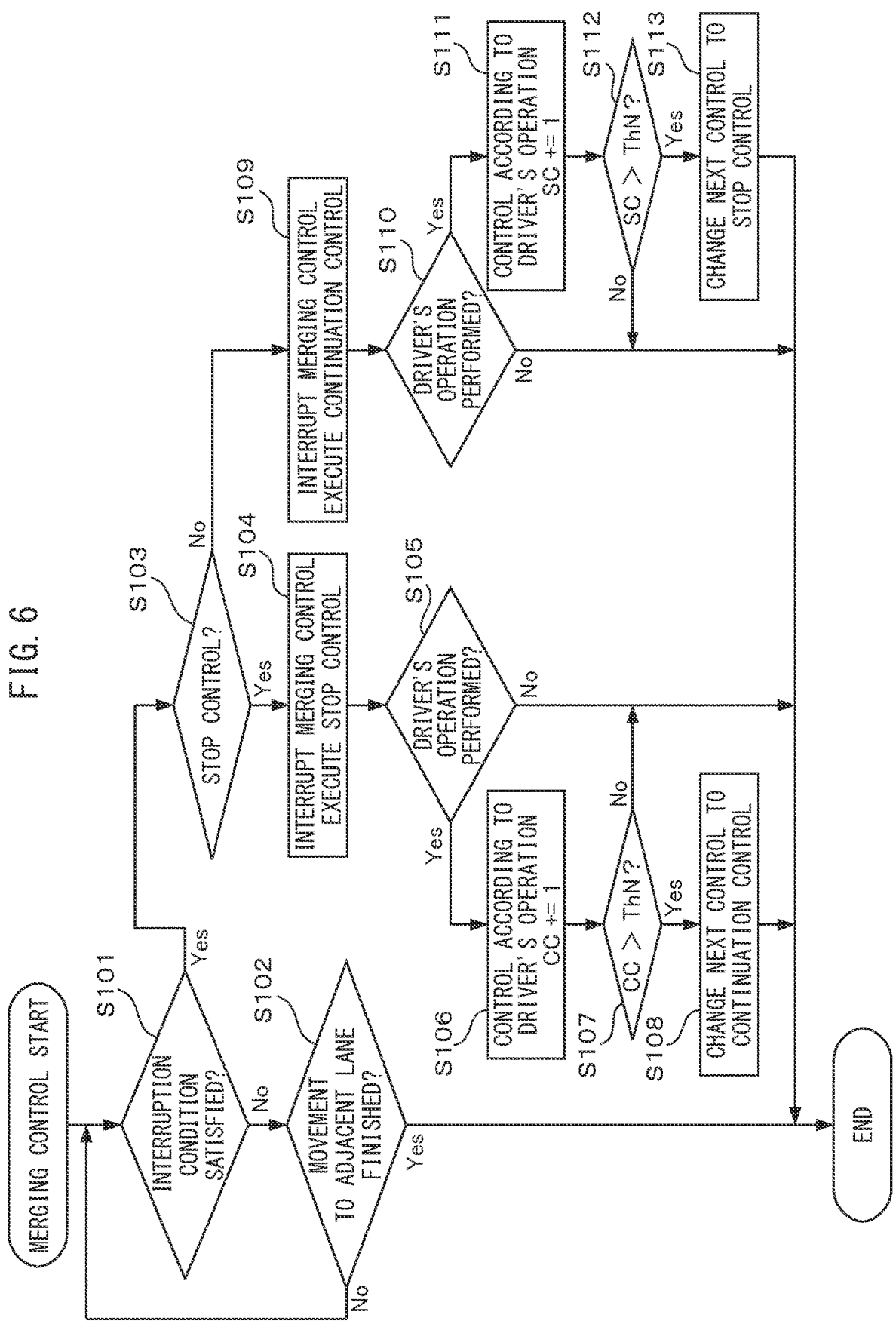
FIG. 6 is an operation flowchart of the vehicle control process according to a first embodiment.

FIG. 6 is an operation flowchart of the vehicle control process according to the first embodiment. When the lane change determination unit 31 determines to apply merging control, the processor 23 executes the vehicle control process related to merging control in accordance with the operation flowchart described below.

The determination unit 34 of the processor 23 determines whether the interruption condition is satisfied, while the control unit 33 of the processor 23 is executing merging control on the vehicle 10 (step S101). When the interruption condition is not satisfied (No in step S101), the control unit 33 determines whether movement of the vehicle 10 to the destination adjacent lane is finished (step S102). When movement of the vehicle 10 to the adjacent lane is finished (Yes in step S102), the processor 23 terminates the vehicle control process. When movement of the vehicle 10 to the adjacent lane is not finished (No in step S102), the processor 23 repeats the processing of step S101 and the subsequent steps.

When the interruption condition is satisfied in step S101 (Yes in step S101), the interruption unit 35 of the processor 23 determines whether control set for interruption of merging control is stop control, by referring to the control flag (step S103). When the set control is stop control (Yes in step S103), the control unit 33 interrupts merging control and executes stop control to stop the vehicle 10 in the host vehicle lane (step S104). In addition, the control unit 33 determines whether continuation operation to continue merging is performed by the driver during execution of stop control (step S105). When continuation operation is performed (Yes in step S105), the control unit 33 stops stop control and thereafter controls the vehicle 10 according to the driver's operation. In addition, the control unit 33 increments the value of the continuation operation count CC by one (step S106).

After step S106, the changing unit 36 of the processor 23 determines whether the value of the continuation operation count CC exceeds a predetermined number ThN (step S107). When the value of the continuation operation count CC exceeds the predetermined number ThN (Yes in step S107), the changing unit 36 rewrites the value of the control flag to change control to be applied at the next interruption of merging control to continuation control (step S108). After step S108 or when the value of the continuation operation count CC does not exceed the predetermined number ThN (No in step S107), the processor 23 terminates the vehicle control process. When continuation operation is not performed in step S105 (No in step S105), the processor 23 also terminates the vehicle control process.

When the set control is continuation control in step S103 (No in step S103), the control unit 33 interrupts merging control and executes continuation control to transfer driving control of the vehicle 10 to the driver and to continue entry of the vehicle 10 into the adjacent lane (step S109). In addition, the control unit 33 determines whether stop operation to stop the vehicle 10 is performed by the driver during execution of continuation control (step S110). When stop operation is performed (Yes in step S110), the control unit 33 stops continuation control and thereafter controls the vehicle 10 according to the driver's operation. In addition, the control unit 33 increments the value of the stop operation count SC by one (step S111).

After step S111, the changing unit 36 of the processor 23 determines whether the value of the stop operation count SC exceeds the predetermined number ThN (step S112). When the value of the stop operation count SC exceeds the predetermined number ThN (Yes in step S112), the changing unit 36 rewrites the value of the control flag to change control to be applied at the next interruption of merging control to stop control (step S113). After step S113 or when the value of the stop operation count SC does not exceed the predetermined number ThN (No in step S112), the processor 23 terminates the vehicle control process. When stop operation is not performed in step S110 (No in step S110), the processor 23 also terminates the vehicle control process.

As has been described above, the vehicle controller according to the first embodiment sets control to be applied out of the continuation control and the stop control, depending on the driver's operation performed during execution of continuation control or stop control after the interruption of merging control. Thus the vehicle controller can match the action of the vehicle at the time of interruption of merging control to the driver's preferences. The vehicle controller can therefore determine whether to continue control to change lanes to be traveled by the vehicle appropriately.

According to a modified example, control to be applied at the time of interruption of merging control may be set for each possible predetermined situation around the vehicle 10. In this case, the memory 22 stores the control flag, the stop operation count, and the continuation operation count for each possible predetermined situation around the vehicle 10. For example, control to be applied may be set separately for the case where the target vehicle traveling on the destination adjacent lane is a large-size vehicle and for the case where the target vehicle is another type of vehicle. In this case, the memory 22 stores control flags provided for respective types of target vehicles. The interruption unit 35 determines which of stop control or continuation control is to be applied, by referring to the control flag corresponding to the type of the target vehicle traveling on the destination adjacent lane detected by the detection unit 32. When multiple target vehicles traveling on the destination adjacent lane are detected, the interruption unit 35 only has to refer to the control flag corresponding to the type of the target vehicle closest to the vehicle 10.

The changing unit 36 calculates the stop operation count and the continuation operation count for each type of target vehicle, and compares the value of the stop operation count or the continuation operation count with the predetermined number for each type of target vehicle to determine whether to change control to be applied at the time of interruption of merging control.

Similarly, control to be applied at the time of interruption of merging control may be set individually, for example, depending on the speed of the vehicle 10, the target vehicle, or a vehicle behind the vehicle 10 at the time of execution of merging control, the width of the host vehicle lane or the adjacent lane, the time of day including the time of execution of merging control, or weather. For example, control to be applied at the time of interruption of merging control may be set individually for the case where the speed of the vehicle 10 at the time of execution of merging control is not greater than 30 km/h and for the case where the speed is greater than 30 km/h. In this case, the interruption unit 35 refers to the control flag corresponding to the speed of the vehicle 10 measured by a vehicle speed sensor (not illustrated) mounted on the vehicle 10. Similarly, the control unit 33 and the changing unit 36 refer to the stop operation count or the continuation operation count corresponding to the speed of the vehicle 10 measured by the vehicle speed sensor. When control to be applied is set individually, depending on the speed of the target vehicle or the vehicle behind, the control unit 33, the interruption unit 35, and the changing unit 36 determines the speed of the target vehicle or the vehicle behind, based on the speed of the vehicle 10 measured by the vehicle speed sensor and the relative speed between the target vehicle or the vehicle behind and the vehicle 10. Of the target vehicles detected from an image generated by the camera 3-2, the interruption unit 35 identifies a target vehicle represented in a region in the image corresponding to the right back of the vehicle 10 as the vehicle behind. Further, the control unit 33, the interruption unit 35, and the changing unit 36 identifies the width of the host vehicle lane or the destination adjacent lane by referring to the latest position of the vehicle 10 measured by the GPS receiver 2 and the high-precision map. Further, the control unit 33, the interruption unit 35, and the changing unit 36 determines the weather around the vehicle 10 at the time of execution of merging control, based on information on the weather at the current position of the vehicle 10 received via the wireless communication terminal (not illustrated) or the result of sensing by a rainfall sensor (not illustrated) mounted on the vehicle 10.

According to the modified example, the interruption unit 35 and the changing unit 36 can set control to be applied at the time of interruption of merging control appropriately, depending on the situation around the vehicle 10 as well as the driver's preferences.

According to another modified example, the control unit 33 may change the increment of the continuation operation count or the stop operation count for the case where continuation operation or stop operation is performed by the driver, depending on the situation around the vehicle 10 at the time of the operation. For example, when the target vehicle traveling on the destination adjacent lane is a large-size vehicle or a two-wheeler, the changing unit 36 sets the increment of the continuation operation count or the stop operation count to a value smaller than usual (e.g., 0.5) or to zero. In the case where control to be applied is set to stop control and where there is a vehicle behind the vehicle 10 at the time of interruption of merging control, the changing unit 36 may set the increment of the continuation operation count to a value smaller than usual or to zero. In addition, when the road including the destination adjacent lane has two or more lanes, the changing unit 36 may also set the increment of the continuation operation count or the stop operation count to a value smaller than usual or to zero. In this case, the changing unit 36 determines whether the road including the destination adjacent lane has two or more lanes, by referring to the current position of the vehicle 10 and the high-precision map.

According to the modified example is reduced the effect of the driver's operation contrary to his/her own preferences caused by the situation around the vehicle 10. Thus the changing unit 36 can prevent control to be applied at the time of interruption of merging control from being changed contrary to the driver's preferences.

In the above-described embodiment or modified examples, stop control or continuation control may be set on a region by region basis as initial setting of control to be applied at the time of interruption of merging control. This is because road shapes of merging sections or typical drivers' driving practices differ from region to region. Thus the interruption unit 35 applies initially set control that matches the road shape of the merging section or the driving practice, which enables appropriately setting control to be applied out of the stop control and the continuation control, depending on the region.

FIGS. 7A and 7B illustrate examples of initial setting of stop control and continuation control according to the modified example.

In the example illustrated in FIG. 7A, a road shoulder 701a beyond a merging section where a host vehicle lane 700 merges with an adjacent lane 701 is narrow. For this reason, stop control to stop the vehicle 10 in the host vehicle lane 700 is set as initial setting of control to be executed at the time of interruption of merging control caused by the approach of a target vehicle 710. In the example illustrated in FIG. 7B, a road shoulder 701b beyond a merging section where a host vehicle lane 700 merges with an adjacent lane 701 has a space enough for the vehicle 10 to travel. For this reason, a certain distance can be kept between a target vehicle 710 and the vehicle 10 even when the target vehicle 710 approaches the vehicle 10. Thus, continuation control to transfer driving control to the driver and to continue entry of the vehicle 10 into the adjacent lane 701 is set as initial setting of control to be executed at the time of interruption of merging control caused by the approach of the target vehicle 710.

In this case, a reference table representing the relationship between regions and the values of the control flag is pre-stored in the memory 22. The reference table is an example of the regional information. By referring to the reference table, the interruption unit 35 identifies the region including the current position of the vehicle 10 measured by the GPS receiver 2, and sets control to be applied out of the stop control and the continuation control according to the value of the control flag set for the identified region. Further, the stop operation count and the continuation operation count are also prepared for each region. By referring to the stop operation count and the continuation operation count corresponding to the region including the current position of the vehicle 10, the changing unit 36 changes the set control on a region by region basis, depending on the driver's operation. Individual regions listed in the reference table are divided, for example, by countries, districts, types of roads (e.g., an expressway and an ordinary road), or road sections. According to the modified example, a change of control to be applied depending on the driver's operation may be omitted because the control to be applied is preset on a region by region basis. Thus the processing of the changing unit 36 may be omitted in the modified example.

Second Embodiment

Next, a second embodiment will be described. In the second embodiment, the ECU 6 interrupts lane change control for the vehicle 10 to change lanes, when an interruption condition is satisfied during execution of lane change control except merging control. The ECU 6 adjusts the interruption condition, depending on the driver's operation before and after the interruption condition is satisfied.

The following describes only the differences between the processing executed in the second embodiment and the processing executed in the first embodiment. Regarding the other details of the processing, see the corresponding description of the processing in the first embodiment.

The lane change determination unit 31 determines whether a predetermined condition for applying lane change control except merging control to the vehicle 10 is satisfied. For example, when the driver operates a direction indicator, the lane change determination unit 31 determines that the predetermined condition is satisfied, and determines to apply the control of a lane change to an adjacent lane adjacent on the side indicated by the direction indicator with respect to the host vehicle lane. Alternatively, the lane change determination unit 31 may determine that the predetermined condition is satisfied, and determine to apply lane change control, when the host vehicle lane differs from a lane leading toward a destination of the vehicle 10, or at the time of passing a vehicle ahead or returning from a passing lane to a travel lane.

To determine whether the host vehicle lane differs from a lane leading toward a destination of the vehicle 10, the lane change determination unit 31 refers to a travel route to the destination of the vehicle 10 received by the ECU 6 from a navigation device (not illustrated), the current position of the vehicle 10, and the high-precision map. The lane change determination unit 31 then determines whether there is a divergent point at which the lane leading toward the destination diverges from the road being currently traveled by the vehicle 10 in a section from the current position of the vehicle 10 to a predetermined distance away. When there is a divergent point, the lane change determination unit 31 determines whether the host vehicle lane differs from the lane leading toward the destination. When the host vehicle lane differs from the lane leading toward the destination, the lane change determination unit 31 determines to apply control of one or more lane changes in which the lane leading toward the destination is the destination lane. As described in relation to the control unit 33 in the first embodiment, the lane change determination unit 31 measures the correct position of the vehicle 10 by comparing an image generated by the camera 3-1 or 3-2 with the high-precision map, and identifies the lane including the measured position of the vehicle 10 among the lanes represented in the high-precision map as the host vehicle lane.

The lane change determination unit 31 determines to apply lane change control to pass a vehicle traveling ahead of the vehicle 10, in the case where the speed of the vehicle 10 falls below a predetermined speed threshold and where the distance between the vehicle ahead and the vehicle 10 has not been greater than a predetermined distance for a predetermined time. The predetermined time may be, for example, several seconds to several tens of seconds. In this case, the lane change determination unit 31 preferably sets a passing lane among the lanes adjacent to the host vehicle lane as the destination lane. Of the target vehicles detected by the detection unit 32, the lane change determination unit 31 identifies a target vehicle represented in an object region within that area in an image generated by the camera 3-1 which corresponds to an area ahead of the vehicle 10 as the vehicle ahead. The predetermined speed threshold is set, for example, at a predetermined offset value (e.g., 10 km/h to 20 km/h) subtracted from the legally permitted speed or the regulation speed of the road being traveled by the vehicle 10. Thus the lane change determination unit 31 refers to the current position of the vehicle 10 and the high-precision map to identify the legally permitted speed or the regulation speed of the road being traveled by the vehicle 10, thereby setting the speed threshold. In addition, the lane change determination unit 31 determines the distance between the vehicle 10 and the vehicle ahead, based on the positional relationship between the vehicle 10 and the vehicle ahead detected by the detection unit 32.

In addition, the lane change determination unit 31 determines to apply lane change control to return the vehicle 10 to a travel lane, in the case where the host vehicle lane is a passing lane and where the vehicle 10 has been traveling on the passing lane for the most recent predetermined period. The lane change determination unit 31 determines whether the host vehicle lane is a passing lane, by referring to the high-precision map. In this case, the lane change determination unit 31 sets one of the travel lanes in the road being traveled by the vehicle 10 as the destination lane.

When determining to apply lane change control to the vehicle 10, the lane change determination unit 31 notifies the result of the determination and the bearing of the destination adjacent lane viewed from the road being traveled by the vehicle 10 (right or left) to the detection unit 32, the control unit 33, the determination unit 34, the interruption unit 35, and the changing unit 36.

The detection unit 32 detects a target vehicle traveling in the vicinity of the vehicle 10 as well as a relative position and a relative speed between the detected target vehicle and the vehicle 10, similarly to the detection unit 32 in the first embodiment. In particular, the detection unit 32 detects a relative position and a relative speed between the vehicle 10 and a target vehicle traveling on the adjacent lane that is the destination of the lane change.

When lane change control is applied, the control unit 33 generates a planned trajectory to move from the host vehicle lane to the destination adjacent lane, and controls components of the vehicle 10 so that the vehicle 10 travels along the planned trajectory, similarly to merging control in the first embodiment. In the present embodiment, the control unit 33 generates a planned trajectory so that the vehicle 10 will enter the adjacent lane in a section from the current position of the vehicle 10 to a predetermined distance away. When the vehicle 10 starts to travel completely inside the adjacent lane, the control unit 33 finishes lane change control.

When instructed by the interruption unit 35 to interrupt lane change control before the completion of lane change control, the control unit 33 interrupts execution of the lane change control. Then the control unit 33 controls components of the vehicle 10 so that the vehicle 10 continues traveling on the host vehicle lane. To this end, the control unit 33 controls the steering, similarly to execution of stop control in the first embodiment.

In the case where operation to continue lane change control is performed by the driver after the interruption of lane change control, the control unit 33 thereafter controls the vehicle 10 according to the driver's operation. For example, when the steering angle by the driver's steering indicates that the vehicle 10 is moving toward the destination adjacent lane, the control unit 33 determines that the driver has performed continuation operation to continue lane change control. Alternatively, when pressing down on the accelerator by the driver is sensed, the control unit 33 may determine that the driver has performed continuation operation. Then the control unit 33 increments, by one, a count value indicating the number of times of continuation operation performed by the driver (hereafter a "continuation operation count") to update the continuation operation count, and stores the updated value of the continuation operation count in the memory 22.

Conversely, in the case where interruption operation to interrupt lane change control is performed by the driver during execution of lane change control, the control unit 33 controls components of the vehicle 10 to continue travel on the host vehicle lane, as when instructed by the interruption unit 35 to interrupt lane change control. Alternatively, the control unit 33 may control the vehicle 10 according to the driver's operation. For example, when the steering angle by the driver's steering indicates a direction such that the vehicle 10 will remain in the host vehicle lane, the control unit 33 determines that the driver has performed interruption operation. Alternatively, when the driver presses down on the brake more than a predetermined amount of braking, the control unit 33 determines that the driver has performed interruption operation. Alternatively, when the driver has performed operation to interrupt lane change operation via the user interface 4, the control unit 33 also determines that the driver has performed interruption operation. Then the control unit 33 increments, by one, a count value indicating the number of times of interruption operation performed by the driver during execution of lane change control (hereafter an "interruption operation count") to update the interruption operation count, and stores the updated value of the interruption operation count in the memory 22.

The determination unit 34 determines whether at least one of the relative position and the relative speed between the vehicle 10 and the target vehicle satisfies an interruption condition during execution of lane change control, as in the first embodiment. When determining that the interruption condition is satisfied, the determination unit 34 notifies the result of the determination to the interruption unit 35. When notified of the result of determination that the interruption condition is satisfied, the interruption unit 35 instructs the control unit 33 to interrupt lane change control.

The changing unit 36 determines whether to change the interruption condition, by referring to the continuation operation count or the interruption operation count stored in the memory 22, at predetermined timing. The predetermined timing may be the timing after a predetermined time from the completion or interruption of lane change control.

For example, when the continuation operation count exceeds a predetermined number, the changing unit 36 changes the interruption condition to tighten the interruption condition. In this case, for example, the changing unit 36 reduces the time threshold for a predicted time until a collision between the target vehicle and the vehicle 10 by a predetermined amount. Alternatively, the changing unit 36 reduces the interruption determination threshold for the distance between the target vehicle and the vehicle 10 by a predetermined amount. Alternatively, the changing unit 36 increases the speed threshold for the relative speed between the target vehicle and the vehicle 10 by a predetermined amount. By changing the interruption condition in this way, interruption of lane change control becomes more unlikely as the number of times of operation by the driver to continue lane change control increases. This makes the timing of interruption of lane change control later. As a result, the timing of interruption of lane change control becomes closer to timing that matches the driver's preferences.

After the continuation operation count exceeds the predetermined number, the changing unit 36 may further tighten the interruption condition every time the value of the continuation operation count increases by a predetermined additional number (e.g., one to several). More specifically, every time the value of the continuation operation count increases by the predetermined additional number, the changing unit 36 reduces the time threshold or the interruption determination threshold by a predetermined amount or increases the speed threshold by a predetermined amount. However, the changing unit 36 preferably changes the interruption condition so as not to tighten the interruption condition more than necessary for ensuring safety of the vehicle 10. Thus the changing unit 36 does not change the time threshold or the interruption determination threshold to a value less than their lower limits, regardless of the value of the continuation operation count. Similarly, the changing unit 36 does not change the speed threshold to a value greater than its upper limit.

FIG. 8 illustrates the relationship between the continuation operation count and the time threshold, which is an example of the interruption condition. In FIG. 8, the abscissa and the ordinate represent the value of the continuation operation count and the time threshold, respectively. A graph 800 represents the relationship between the value of the continuation operation count and the time threshold.

As illustrated by the graph 800, the time threshold is kept constant until the value of the continuation operation count exceeds a predetermined number N. Thereafter, every time the value of the continuation operation count increases, the time threshold decreases. However, after the time threshold reaches its lower limit ThL, the time threshold is kept constant even when the value of the continuation operation count increases.

When the interruption operation count exceeds a predetermined number, the changing unit 36 changes the interruption condition to relax the interruption condition. In this case, for example, the changing unit 36 increases the time threshold for a predicted time until a collision between the target vehicle and the vehicle 10 by a predetermined amount. Alternatively, the changing unit 36 increases the interruption determination threshold for the distance between the target vehicle and the vehicle 10 by a predetermined amount. Alternatively, the changing unit 36 reduces the speed threshold for the relative speed between the target vehicle and the vehicle 10 by a predetermined amount. By changing the interruption condition in this way, interruption of lane change control becomes more likely as the number of times of operation by the driver to interrupt lane change control increases. This makes the timing of interruption of lane change control earlier. As a result, the timing of interruption of lane change control becomes closer to timing that matches the driver's preferences.

After the interruption operation count exceeds the predetermined number, the changing unit 36 may further relax the interruption condition every time the value of the interruption operation count increases by a predetermined additional number (e.g., one to several). More specifically, every time the value of the interruption operation count increases by the predetermined additional number, the changing unit 36 increases the time threshold or the interruption determination threshold by a predetermined amount or reduces the speed threshold by a predetermined amount. However, to avoid lane change control being interrupted too many times, the changing unit 36 preferably does not change the time threshold or the interruption determination threshold to a value greater than their upper limits. Similarly, the changing unit 36 preferably does not change the speed threshold to a value less than its lower limit.

According to a modified example, the changing unit 36 may tighten the interruption condition when the value of the continuation operation count exceeds the sum of the value of the interruption operation count and a predetermined number. Conversely, the changing unit 36 may relax the interruption condition when the value of the interruption operation count exceeds the sum of the value of the continuation operation count and a predetermined number.

According to another modified example, the changing unit 36 may tighten the interruption condition when the ratio of the continuation operation count to the number of times of interruption of lane change control exceeds a predetermined ratio. In addition, the changing unit 36 may tighten the interruption condition more as the ratio of the continuation operation count to the number of times of interruption of lane change control increases. The changing unit 36 may relax the interruption condition when the ratio of the interruption operation count to the number of times of execution of lane change control exceeds a predetermined ratio. In addition, the changing unit 36 may relax the interruption condition more as the ratio of the interruption operation count to the number of times of execution of lane change control increases.

Figure 9:
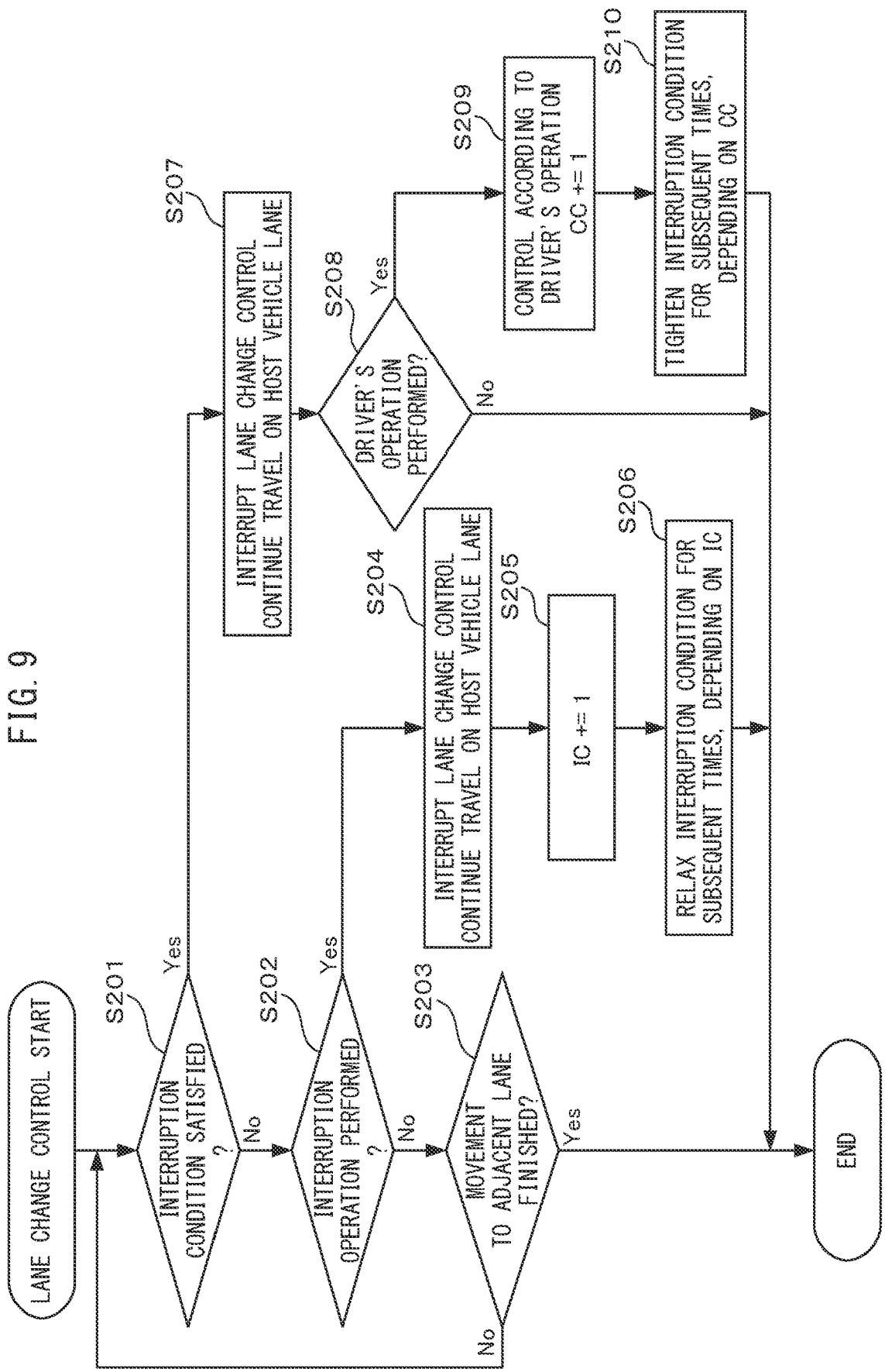
FIG. 9 is an operation flowchart of the vehicle control process according to the second embodiment.

FIG. 9 is an operation flowchart of the vehicle control process according to the second embodiment. When the lane change determination unit 31 determines to apply lane change control, the processor 23 executes the vehicle control process related to lane change control in accordance with the operation flowchart described below.

The determination unit 34 of the processor 23 determines whether the interruption condition is satisfied, while the control unit 33 of the processor 23 is executing lane change control on the vehicle 10 (step S201). When the interruption condition is not satisfied (No in step S201), the control unit 33 determines whether interruption operation to interrupt lane change control is performed by the driver (step S202). When interruption operation is not performed (No in step S202), the control unit 33 determines whether movement of the vehicle 10 to the destination adjacent lane is finished (step S203). When movement of the vehicle 10 to the adjacent lane is finished (Yes in step S203), the processor 23 terminates the vehicle control process related to lane change control. When movement of the vehicle 10 to the adjacent lane is not finished (No in step S203), the processor 23 repeats the processing of step S201 and the subsequent steps.

When interruption operation is performed in step S202 (Yes in step S202), the control unit 33 interrupts lane change control and controls the vehicle 10 to continue travel on the host vehicle lane (step S204). In addition, the control unit 33 increments the value of the interruption operation count IC by one (step S205). Depending on the value of the interruption operation count IC, the changing unit 36 relaxes the interruption condition to be applied at the subsequent times (step S206). Thereafter, the processor 23 terminates the vehicle control process related to lane change control.

When interruption condition is satisfied in step S201 (Yes in step S201), the control unit 33 interrupts lane change control and controls the vehicle 10 to continue travel on the host vehicle lane (step S207). Then the control unit 33 determines whether continuation operation to continue lane change control is performed by the driver (step S208). When continuation operation is not performed by the driver (No in step S208), the processor 23 terminates the vehicle control process related to lane change control.

When continuation operation is performed by the driver (Yes in step S208), the control unit 33 thereafter controls the vehicle 10 according to the driver's operation and increments the value of the continuation operation count CC by one (step S209). Depending on the value of the continuation operation count CC, the changing unit 36 tightens the interruption condition to be applied at the subsequent times (step S210). Thereafter, the processor 23 terminates the vehicle control process related to lane change control.

As has been described above, the vehicle controller according to the second embodiment changes the interruption condition, depending on the driver's operation before or after the interruption of lane change control. Thus the vehicle controller can match the interruption condition, which is used for determining whether to interrupt lane change control, to the driver's preferences. The vehicle controller can therefore bring the timing of interruption of lane change control close to timing that matches the driver's preferences.

According to a modified example, the interruption condition may be set for each situation around the vehicle 10, and the changing unit 36 may change the interruption condition for each situation around the vehicle 10, as in the modified example of the first embodiment. For example, the interruption condition may be set separately for the case where the target vehicle traveling on the destination adjacent lane is a large-size vehicle and for the case where the target vehicle is another type of vehicle. The determination unit 34 determines whether to interrupt lane change control, based on the interruption condition corresponding to the type of the target vehicle traveling on the destination adjacent lane detected by the detection unit 32. When multiple target vehicles traveling on the destination adjacent lane are detected, the determination unit 34 only has to use the interruption condition corresponding to the type of the target vehicle closest to the vehicle 10.

The changing unit 36 calculates the interruption operation count and the continuation operation count for each type of target vehicle, and changes the interruption condition for each type of target vehicle, based on the value of the interruption operation count or the continuation operation count.

Similarly, the interruption condition may be set individually, depending on the speed of the vehicle 10, the target vehicle, or a vehicle behind the vehicle 10 at the time of execution of lane change control, the width of the host vehicle lane or the adjacent lane, the type of the adjacent lane (e.g., a passing lane or a travel lane), the time of day including the time of execution of lane change control, or weather. In this case, the control unit 33, the determination unit 34, and the changing unit 36 identify the interruption condition to be used as well as the interruption operation count and the continuation operation count corresponding to the interruption condition, by referring to the speed of the vehicle 10 measured by the vehicle speed sensor, the high-precision map, weather information, or the like, as in the modified example of the first embodiment. In addition, the interruption condition may be set individually for each event that has triggered a lane change (e.g., a lane change for passing a vehicle ahead or for moving to a lane leading toward a destination). In this case, the determination unit 34 receives trigger information indicating the event that has triggered the lane change from the lane change determination unit 31, and selects an interruption condition according to the trigger information. In addition, the control unit 33 and the changing unit 36 also receive the trigger information from the lane change determination unit 31, and identify a corresponding interruption operation count and continuation operation count according to the trigger information.

According to the modified example, the changing unit 36 can set the interruption condition appropriately, depending on the situation around the vehicle 10 as well as the driver's preferences.

According to another modified example, the control unit 33 may change the increment of the continuation operation count or the interruption operation count for the case where the driver's operation is performed, depending on the situation around the vehicle 10. For example, when the target vehicle traveling on the destination adjacent lane is a large-size vehicle or a two-wheeler, the changing unit 36 sets the increment of the continuation operation count or the interruption operation count to a value smaller than usual (e.g., 0.5) or to zero. When the road being traveled by the vehicle 10 has three or more lanes, the changing unit 36 may also set the increment of the continuation operation count or the continuation operation count to a value smaller than usual or to zero. In this case, the changing unit 36 determines whether the road being traveled by the vehicle 10 has three or more lanes, by referring to the current position of the vehicle 10 and the high-precision map.

According to the modified example is reduced the effect of the driver's operation contrary to his/her own preferences caused by the situation around the vehicle 10. Thus the changing unit 36 can prevent the timing of interruption of lane change control from deviating from timing that matches the driver's preferences.

According to still another modified example, the processor 23 may switch the vehicle control process to be executed between the vehicle control process related to merging control according to the first embodiment or one of its modified examples and the vehicle control process related to lane change control according to the second embodiment or one of its modified examples, based on the result of determination by the lane change determination unit 31. More specifically, when the lane change determination unit 31 determines to execute merging control, the processor 23 executes the vehicle control process related to merging control in accordance with the first embodiment or one of its modified examples. When the lane change determination unit 31 determines to execute the lane change process except merging control, the processor 23 executes the vehicle control process related to lane change control in accordance with the second embodiment or one of its modified examples.

The computer program for achieving the functions of the processor 23 of the ECU 6 according to one of the embodiments and modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
a processor configured to:
    detect, when a first lane on which a host vehicle is traveling merges with a second lane, a relative position and a relative speed between the host vehicle and another vehicle traveling on the second lane,
    execute merging control of the host vehicle to make the host vehicle enter the second lane,
    execute, when the merging control is interrupted, stop control to stop the host vehicle in the first lane or continuation control to continue entry of the host vehicle into the second lane and to transfer driving control to a driver of the host vehicle,
    determine whether at least one of the detected relative position and the detected relative speed satisfies an interruption condition during execution of the merging control,
    interrupt the merging control and execute set control out of the stop control and the continuation control, when the interruption condition is satisfied,
    change the set control to the continuation control, depending on continuation operation performed by the driver during execution of the stop control to continue entry of the host vehicle into the second lane, and
    change the set control to the stop control, depending on stop operation performed by the driver during execution of the continuation control to stop the host vehicle.

2. The vehicle controller according to claim 1, wherein the processor
    does not change the set control until the number of times of the continuation operation or the number of times of the stop operation exceeds a predetermined number,
    changes the set control to the continuation control when the number of times of the continuation operation performed during execution of the stop control exceeds the predetermined number, and
changes the set control to the stop control when the number of times of the stop operation performed during execution of the continuation control exceeds the predetermined number.

3. The vehicle controller according to claim 2, wherein the processor changes the increment of the number of times for the case where the continuation operation is performed by the driver during execution of the stop control, depending on the situation around the host vehicle at the time of the continuation operation.

4. The vehicle controller according to claim 1, wherein the processor changes the set control to the continuation control when the ratio of the number of times of the continuation operation performed during execution of the stop control to the number of times of execution of the stop control exceeds a predetermined ratio.

5. The vehicle controller according to claim 1, further comprising a memory configured to store control information indicating the set control out of the stop control and the continuation control for each predetermined situation, wherein
the processor identifies the set control corresponding to the situation around the host vehicle by referring to the control information.

6. A vehicle controller comprising:
a processor configured to:
detect, when a first lane on which a host vehicle is traveling merges with a second lane, a relative position and a relative speed between the host vehicle and another vehicle traveling on the second lane,
execute merging control of the host vehicle to make the host vehicle enter the second lane, and
execute, when the merging control is interrupted, stop control to stop the host vehicle in the first lane or continuation control to continue entry of the host vehicle into the second lane and to transfer driving control to a driver of the host vehicle; and
a memory configured to store regional information indicating a region where the stop control is executed and a region where the continuation control is executed; wherein
the processor determines whether at least one of the detected relative position and the detected relative speed satisfies an interruption condition during execution of the merging control, and
when the interruption condition is satisfied, the processor identifies control to be applied out of the stop control and the continuation control by referring to the position of the host vehicle and the regional information, interrupts the merging control, and executes the identified control.

7. A vehicle controller comprising:
a processor configured to:
detect a relative position and a relative speed between a host vehicle and another vehicle traveling on an adjacent lane adjacent to a host vehicle lane on which the host vehicle is traveling,
execute lane change control of the host vehicle, when a predetermined condition is satisfied, so that the host vehicle makes a lane change from the host vehicle lane to the adjacent lane,
determine whether at least one of the detected relative position and the detected relative speed satisfies an interruption condition during execution of the lane change control,
interrupt the lane change control when the interruption condition is satisfied,
relax the interruption condition, depending on operation performed by a driver of the host vehicle before satisfaction of the interruption condition to interrupt the lane change control, and
tighten the interruption condition, depending on operation performed by the driver at the time of satisfaction of the interruption condition to continue the lane change control.

8. The vehicle controller according to claim 7, wherein the processor does not change the interruption condition until the number of times of the operation to continue or the number of times of the operation to interrupt exceeds a predetermined number.

9. The vehicle controller according to claim 7, further comprising a memory configured to store, for each predetermined situation, the interruption condition corresponding to the situation, wherein
the processor determines whether at least one of the detected relative position and the detected relative speed satisfies the interruption condition corresponding to the situation around the host vehicle.

10. A method for vehicle control, comprising:
detecting, when a first lane on which a host vehicle is traveling merges with a second lane, a relative position and a relative speed between the host vehicle and another vehicle traveling on the second lane;
executing merging control of the host vehicle to make the host vehicle enter the second lane;
executing, when the merging control is interrupted, stop control to stop the host vehicle in the first lane or continuation control to continue entry of the host vehicle into the second lane and to transfer driving control to a driver of the host vehicle;
determining whether at least one of the detected relative position and the detected relative speed satisfies an interruption condition during execution of the merging control;
interrupting the merging control and executing set control out of the stop control and the continuation control, when the interruption condition is satisfied;
changing the set control to the continuation control, depending on continuation operation performed by the driver during execution of the stop control to continue entry of the host vehicle into the second lane; and
changing the set control to the stop control, depending on stop operation performed by the driver during execution of the continuation control to stop the host vehicle.

11. A non-transitory recording medium that stores a computer program for vehicle control, the computer program causing a processor mounted on a host vehicle to execute a process comprising:
detecting, when a first lane on which the host vehicle is traveling merges with a second lane, a relative position and a relative speed between the host vehicle and another vehicle traveling on the second lane;
executing merging control of the host vehicle to make the host vehicle enter the second lane;
executing, when the merging control is interrupted, stop control to stop the host vehicle in the first lane or continuation control to continue entry of the host vehicle into the second lane and to transfer driving control to a driver of the host vehicle;

determining whether at least one of the detected relative position and the detected relative speed satisfies an interruption condition during execution of the merging control;

interrupting the merging control and executing set control out of the stop control and the continuation control, when the interruption condition is satisfied;

changing the set control to the continuation control, depending on continuation operation performed by the driver during execution of the stop control to continue entry of the host vehicle into the second lane; and changing the set control to the stop control, depending on stop operation performed by the driver during execution of the continuation control to stop the host vehicle.

\* \* \* \* \*